(12) United States Patent
Xing et al.

(10) Patent No.: US 11,686,869 B2
(45) Date of Patent: Jun. 27, 2023

(54) SEISMIC VIBRATOR, VIBRATION DEVICE AND DRIVING APPARATUS FOR THE SAME

(71) Applicant: JILIN UNIVERSITY, Jilin (CN)

(72) Inventors: Xuefeng Xing, Jilin (CN); Yuda Chen, Jilin (CN); Guanyu Zhang, Jilin (CN); Xunqian Tong, Jilin (CN); Jun Lin, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 692 days.

(21) Appl. No.: 16/474,625

(22) PCT Filed: Apr. 19, 2017

(86) PCT No.: PCT/CN2017/081148
§ 371 (c)(1),
(2) Date: Sep. 16, 2019

(87) PCT Pub. No.: WO2018/120525
PCT Pub. Date: Jul. 5, 2018

(65) Prior Publication Data
US 2020/0386902 A1  Dec. 10, 2020

(30) Foreign Application Priority Data

Dec. 28, 2016 (CN) .......................... 201611237689.5
Dec. 28, 2016 (CN) .......................... 201611238953.7
Dec. 28, 2016 (CN) .......................... 201611238960.7

(51) Int. Cl.
*G01V 1/04* (2006.01)

(52) U.S. Cl.
CPC ...................... *G01V 1/04* (2013.01)

(58) Field of Classification Search
CPC ..................................................... G01V 1/04
See application file for complete search history.

(56) References Cited

U.S. PATENT DOCUMENTS 6,488,117 B1 * 12/2002 Owen .................... G01V 1/143
                                                        181/102
8,061,471 B2    11/2011 Wei
(Continued)

FOREIGN PATENT DOCUMENTS

CN        2368043 Y  *  3/2000
CN        2368043 Y  *  3/2000
(Continued)

OTHER PUBLICATIONS

International Search Report (in English) and Written Opinion for International Application No. PCT/CN2017/081148, dated Sep. 25, 2017, 6 pages.
(Continued)

*Primary Examiner* — Isam A Alsomiri
*Assistant Examiner* — Abdallah Abulaban
(74) *Attorney, Agent, or Firm* — Westman, Champlin & Koehler, P.A.

(57) ABSTRACT

The present disclosure discloses a seismic vibrator, a vibration device and a driving apparatus for the same. The seismic vibrator comprises: a base; a mounting plate; a first spring configured to connect the base and the mounting plate, so that the mounting plate reciprocates relative to the base; a coil fixed with the base; a magnet having one end fixed with the mounting plate, and the other end stretched into the coil; a magnetic steel fixed with the magnet, wherein a gap for accommodating the coil is provided between the magnetic steel and the magnet; and a counterweight fixed with the mounting plate. The vibration device comprises the above seismic vibrator and an adjustable base. Compared with the traditional electromagnetic controllable seismic vibrator, the structure of the seismic vibrator provided by the present disclosure is simpler.

15 Claims, 18 Drawing Sheets

(56) References Cited

U.S. PATENT DOCUMENTS

| | | | |
|---|---|---|---|
| 8,699,302 B2 | 4/2014 | Zowarka et al. | |
| 2010/0232260 A1 | 9/2010 | Zowarka et al. | |
| 2010/0276224 A1 | 11/2010 | Wei | |

FOREIGN PATENT DOCUMENTS

| | | | | |
|---|---|---|---|---|
| CN | 1281757 | A | 1/2001 | |
| CN | 2814437 | Y | 9/2006 | |
| CN | 201090986 | Y | 7/2008 | |
| CN | 101285891 | A | 10/2008 | |
| CN | 201594144 | U | 9/2010 | |
| CN | 102428389 | A | 4/2012 | |
| CN | 102508289 | A | 6/2012 | |
| CN | 102460217 | B | 2/2014 | |
| CN | 104570053 | A | 4/2015 | |
| CN | 205103411 | U | 3/2016 | |
| CN | 106501846 | A | 3/2017 | |
| CN | 106526657 | A | 3/2017 | |
| CN | 206440837 | U | 8/2017 | |
| CN | 206450838 | U | 8/2017 | |
| DE | 102014206773 A1 * | | 10/2015 | H04R 9/06 |
| SU | 1022101 | A | 6/1983 | |

OTHER PUBLICATIONS

First Office Action, including Search Report, forChinese Patent Application No. 201611238960.7, dated Mar. 28, 2018, 6 pages.
Second Office Action, including Search Report, for Chinese Patent Application No. 201611238953.7, dated Feb. 22, 2019, 5 pages.
First Office Action, including Search Report, for Chinese Patent Application No. 201611238953.7, dated Jun. 1, 2018, 6 pages.
Second Office Action, including Search Report, for Chinese Patent Application No. 201611237689.5, dated Dec. 5, 2018, 5 pages.
First Office Action, including Search Report, for Chinese Patent Application No. 201611237689.5, dated Mar. 21, 2018, 16 pages.

\* cited by examiner

| Start identifier | Driving mode bit | Frequency | Amplitude | Phase | End identifier |
|---|---|---|---|---|---|

FIG.18a

| Start identifier | Driving mode bit | Start frequency | Amplitude | Phase | End frequency | End identifier |
|---|---|---|---|---|---|---|

FIG.18b

SEISMIC VIBRATOR, VIBRATION DEVICE AND DRIVING APPARATUS FOR THE SAME

CROSS-REFERENCE TO RELATED APPLICATION

This application is a Section 371 National Stage application of International Application No. PCT/CN2017/081148, filed on 19 Apr. 2017, and claims priority to Chinese Patent Application Nos. 2016112376895, filed on Dec. 28, 2016 and entitled "CONTROLLABLE SEISMIC VIBRATOR AND VIBRATION DEVICE BASED ON VECTOR SYNTHESIS OF SEISMIC WAVE", 2016112389607, filed on Dec. 28, 2016 and entitled "DRIVING APPARATUS OF SEISMIC VIBRATOR AND SEISMIC WAVE GENERATION DEVICE BASED ON INTERFACE COMPENSATION", and 2016112389537, filed on Dec. 28, 2016 and entitled "ELECTROMAGNETIC CONTROLLABLE SEISMIC VIBRATOR", which are incorporated herein by reference in their entireties in this disclosure.

BACKGROUND OF THE DISCLOSURE

Field of the Disclosure

The present disclosure relates to the field of geological exploration, and in particular, to a seismic vibrator, a vibration device and a driving apparatus for the same.

Description of the Related Art

The principle of seismic exploration is to excite a seismic wave in an artificial method on the earth's surface. The seismic wave is reflected and refracted when encountering a rock stratum interface having a different medium property in underground propagation. Such a seismic wave is received by using a wave detector on the earth's surface or in a well. The received seismic wave signal is relevant to a characteristic of a seismic vibrator, a position of a wave detection point, and a property and a structure of an underground rock stratum through which the seismic wave passes. By recording the seismic wave for processing and explaining, the property and the form of the underground rock stratum may be concluded.

Typically, a seismic vibrator system may comprise a seismic vibrator and a driver; the driver applies an electrical signal to the seismic vibrator, and the seismic vibrator converts the electrical signal into mechanical vibration, thus generating the seismic wave. By changing an electrical characteristic of the electrical signal applied by the driver, the vibration characteristic of the seismic vibrator may be changed, and thus parameters such as a frequency, an amplitude and a direction of the seismic wave are changed.

The developed typical seismic vibrators comprise an explosive seismic vibrator, a dead weight seismic vibrator, a tamping seismic vibrator, a hydraulic seismic vibrator, and an electromagnetic controllable seismic vibrator, etc. The electromagnetic controllable seismic vibrator is a non-explosive seismic vibrator applied to land and ocean seismic exploration work, and it can excite a controllable vibration signal with a small energy for a to-be-detected mechanism, and achieves the excitation effect of a high-power seismic wave similar to the explosive seismic vibrator by using a pulse compression method and the like. With controllable waveform parameters, safety and environmental protection, the electromagnetic controllable seismic vibrator has been widely applied in the seismic exploration.

The structure of the electromagnetic controllable seismic vibrator mainly comprises a coil and a magnet. In the existing electromagnetic controllable seismic vibrator often uses a manner that the magnet is fixed, a coil makes a relative motion relative to the magnet to convert the electrical signal in the coil into a mechanical vibration signal and transmit the mechanical vibration signal to a to-be-detected mechanism in a form of the seismic wave. The above controllable seismic vibrator has a complicated structure to achieve the motion of the coil.

Therefore, it is expected to further optimize the structure of the controllable seismic vibrator.

SUMMARY

In view of this, the embodiments of the present disclosure provide a seismic vibrator and a vibration device, to achieve the purpose of replacing an explosive seismic vibrator with a nondestructive seismic vibrator in seismic exploration and making the seismic vibrator has a simpler structure.

According to first aspect of the present disclosure, there is provided a seismic vibrator, comprising: a base; a mounting plate; a first spring configured to connect the base and the mounting plate, so that the mounting plate reciprocates relative to the base; a coil fixed with the base; a magnet having one end fixed with the mounting plate, and the other end stretched into the coil; a magnetic steel fixed with the magnet, wherein a gap for accommodating the coil is provided between the magnetic steel and the magnet; and a counterweight fixed with the mounting plate.

Preferably, a through hole is arranged on the mounting plate; and the seismic vibrator further comprises: at least one set of guide structures, wherein each set of the guide structures comprises a supporting rod and a linear bearing; the linear bearing passes through the through hole on the mounting plate to fix on the mounting plate; and one end of the supporting rod passes through the linear bearing, and the other end of the supporting rod is fixed with the base, so that the mounting plate slides along the supporting rod, the number of the first springs is the same as the number of sets of the guide structures, the first spring disposed coaxially with the supporting rod, wherein the supporting rod is located in the first spring.

Preferably, the mounting plate comprises a first surface facing to the base and a second surface backing to the base; and the magnet and the magnetic steel are arranged at the first surface, and the counterweight is arranged at the second surface.

Preferably, further comprising at least one of followings: a coil bracket configured to fix the coil and the base, wherein the coil bracket is of a hollow cylindrical shape, the coil bracket is fixed with the base, and the coil is arranged on an outer circumferential surface of the coil bracket; a spring bracket configured to fix the first spring and the base.

Preferably, further comprising: a shell covered on the base, and forms a space with the base for accommodating an internal structure of the seismic vibrator.

Preferably, the shell comprises a top surface opposite to the base and a lateral surface located between the top surface and the base, and the seismic vibrator further comprises: a second spring configured to connect the mounting plate to the top surface of the shell.

According to second aspect of the present disclosure, there is provided a vibration device, comprising: a plurality of the above seismic vibrators; and adjustable bases disposed below each seismic vibrator, and is configured to adjust position, inclination angle and direction of each the seismic vibrator.

Preferably, the adjustable bases are arranged so that plurality of the seismic vibrators are equidistantly distributed on a same circumference in a same horizontal plane; and inclination angles of central axes of plurality of the seismic vibrators relative to a vertical direction are the same.

Preferably, the number of the seismic vibrators is three.

According to third aspect of the present disclosure, there is provided a seismic vibrator, comprising: a base; a coil fixed on the base; a magnet; a magnetic steel fixed with the magnet; and a spring configured to connect the magnet and/or the magnetic steel to the base, so that the magnet and the magnetic steel reciprocates relative to the coil.

Preferably, further comprising: a coil bracket, configured to fix the coil and the base, wherein the coil bracket is of a hollow cylindrical shape, the coil bracket is fixed with the base, and the coil is arranged on an outer circumferential surface of the coil bracket.

Preferably, a plurality of through holes communicating an interior and an exterior of the coil bracket are arranged at the base and/or the coil bracket; and plurality of the through holes are uniformly arranged at the base and/or the coil bracket.

Preferably, further comprising: a set of guide structures coaxially arranged with the coil bracket, and each set of the guide structures comprises a supporting rod and a linear bearing, wherein the linear bearing is fixed on the base; and one end of the supporting rod is fixed with the magnet and/or the magnetic steel, and the other end of the supporting rod passes through the linear bearing, so that the magnet and the magnetic steel slide along the supporting rod.

Preferably, the magnetic steel is of a hollow cylindrical shape having an opened one end and a sealed end; the magnet is of a cylindrical shape and passes through the opened end of the magnetic steel to fix with the sealed end of the magnetic steel; an outer diameter of the magnet is smaller than an inner diameter of the magnetic steel, so that a gap is arranged between an outer circumferential surface of the magnet and an inner circumferential surface of the magnetic steel, and the gap is corresponding to the coil so that the coil is accommodated.

Preferably, one the spring is provided, the spring coaxially arranged with the supporting rod, and the supporting rod is located in the spring.

Preferably, a plurality of the springs are provided and uniformly arranged at the opened end of the magnetic steel; and certain ends of the springs are connected to the magnetic steel, and the other ends of the springs are connected to the base.

According to forth aspect of the present disclosure, there is provided a driving apparatus, configured to drive the above seismic vibrator, and comprising: a control module configured to generate a control instruction, and adjusts the control instruction according to acceleration information and output force information of the seismic vibrator; a signal generation module configured to generate a control signal according to the control instruction, and provides the control signal for the seismic vibrator so that the seismic vibrator vibrates according to the control signal; an acceleration sensing module arranged on the seismic vibrator, and configured to sense an acceleration of the seismic vibrator to obtain the acceleration information of the seismic vibrator; and a force sensing module arranged on the seismic vibrator, and configured to sense an output force generated by the seismic vibrator via vibration to obtain the output force information of the seismic vibrator.

Preferably, the control module comprises: an upper computer configured to generate parameter information according to a control parameter input by a user, and adjust the parameter information according to the acceleration information and the output force information of the seismic vibrator; and a lower computer configured to receive the parameter information being adjusted from the upper computer, and generate the control instruction according to the parameter information being adjusted.

Preferably, the parameter information comprises a driving mode and a driving parameter; when the driving mode is a single-frequency driving mode, the driving parameter comprises a frequency, an amplitude and a phase of the control signal; and when the driving mode is a frequency-sweeping driving mode, the driving parameter comprises a start frequency, an end frequency, an amplitude, a phase and frequency-sweeping time of the control signal.

Preferably, the upper computer and the lower computer are connected via a universal serial bus (USB) or a serial port.

Preferably, the signal generation module comprises: a direct digital synthesizer (DDS) chip configured to generate the control signal according to the control instruction from the lower computer; an isolated amplifier configured to perform isolated amplification on the control signal generated by the direct digital synthesizer chip; and a power amplifier configured to perform power amplification on the control signal being the isolated amplification, and provide the control signal being the power amplification for the seismic vibrator.

According to fifth aspect of the present disclosure, there is provided a SEISMIC WAVE GENERATION DEVICE, comprising: the above seismic vibrator; and the above driving apparatus, wherein the driving apparatus is connected to the seismic vibrator to drive the seismic vibrator.

According to sixth aspect of the present disclosure, there is provided a SEISMIC WAVE GENERATION DEVICE, comprising: the above vibration device; and the above driving apparatus, wherein the driving apparatus is connected to a plurality of seismic vibrators in the vibration device to drive plurality of the seismic vibrators.

BRIEF DESCRIPTION OF THE DRAWINGS

By following description of embodiments with reference to the accompanying drawings of the present invention, the above and other objects, advantages and features of the present disclosure will become more fully apparent, and wherein:

FIG. 18a and FIG. 18b are structural diagram of an example of parameter information according to an embodiment of the present disclosure.

DETAILED DESCRIPTION OF THE DISCLOSURE

Figure 1:
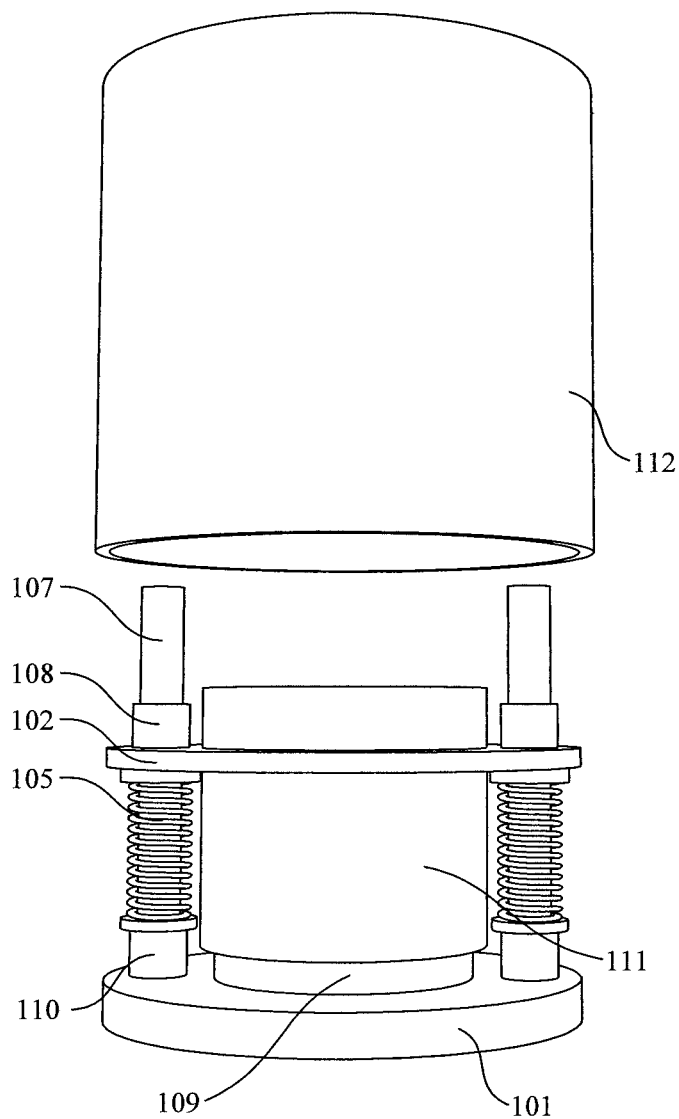
FIG. 1 and FIG. 2 are stereoscopic views of a seismic vibrator according to a first embodiment of the present disclosure.

Exemplary embodiments of the present disclosure will be described in more details below with reference to the accompanying drawings. In the drawings, like reference numerals denote like members. The figures are not drawn to scale, for the sake of clarity. In addition, some known parts may be not shown. Many particular details of the present disclosure are described below. However, as a person skilled in the art can understand that the present disclosure may not be achieved according to these particular details.

It should be understood that in the description of a structure of a component, when one layer and one area are referred to as being located "on" or "above" another layer and another area, it may be indicated that the layer and the area are directly located on the another layer and the another area, or any other layer or area is further comprised between the layer and the area and the another layer and the another area. Furthermore, if the component is turned over, the layer and the area are located "under" or "below" the another layer and the another area.

Figure 2:
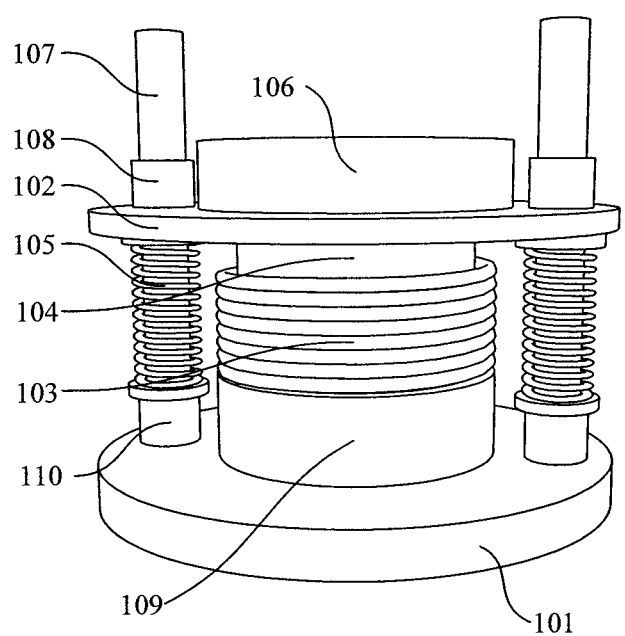
Figure 3:
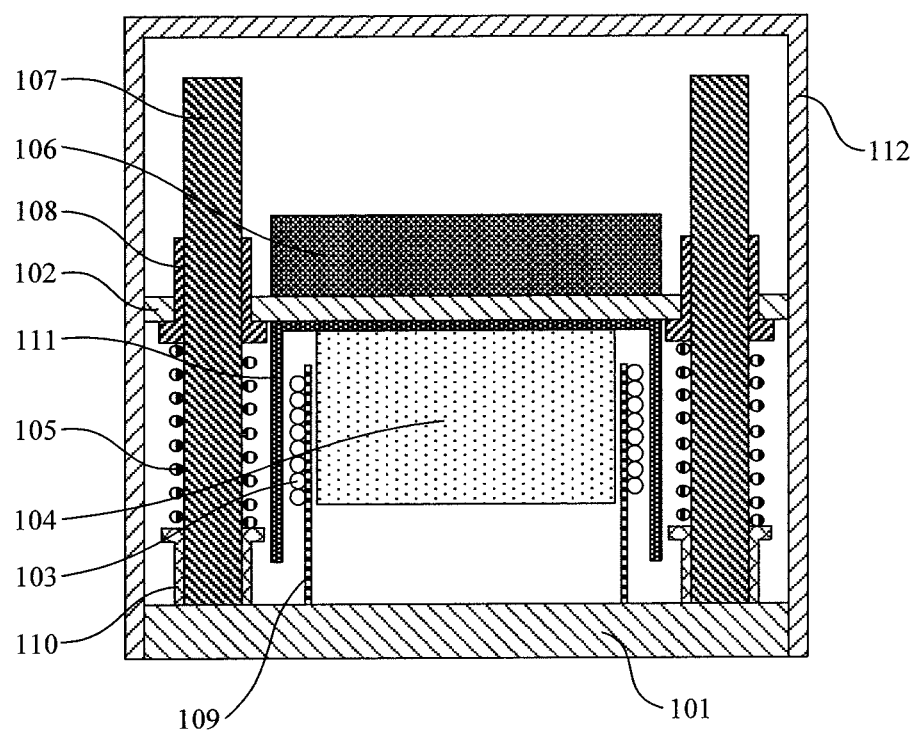
FIG. 3 is a sectional view of the seismic vibrator according to the first embodiment of the present disclosure.

An embodiment of the present disclosure provides a seismic vibrator. FIG. 1 and FIG. 2 are stereoscopic views of the seismic vibrator according to a first embodiment of the present disclosure. In order to show an internal structure of the seismic vibrator 100 clearly, parts of structures are drawn in a separated manner or in a hidden manner in FIG. 1 and FIG. 2. FIG. 3 is a sectional view of the seismic vibrator according to the first embodiment of the present disclosure.

The seismic vibrator 100 is an electromagnetic controllable seismic vibrator, and comprises: a base 101, a mounting plate 102, a coil 103, a magnet 104, a first spring 105 and a counterweight 106. The coil 103 is fixed with the base 101. The first spring 105 is configured to connect the base 101 and the mounting plate 102, so that the mounting plate 102 reciprocates relative to the base 101. One end of the magnet 104 is fixed with the mounting plate 102, and the other end of the magnet 104 is stretched into the coil 103, so that the magnet 104 reciprocates relative to the coil 103 with the mounting plate 102, and thus an electrical signal in the coil 102 is converted into a mechanical vibration signal and is to be transmitted in a form of a seismic wave. The counterweight 106 is fixed with the mounting plate 102. In order to show the internal structure of the seismic vibrator 100 clearly, a shell 112 and the base 101 are appropriately separated for drawing in FIG. 1. In order to further show the internal structure of the seismic vibrator 100 clearly, the shell 112 and a magnetic steel are hidden for drawing in FIG. 2.

According to this embodiment, the seismic vibrator 100 may further comprises: at least one set of guide structures, where each set of the guide structures comprises a supporting rod 107 and a linear bearing 108; a through hole is provided on the mounting plate 102; the linear bearing 108 passes through the through hole on the mounting plate 102 to fix on the mounting plate 102; and one end of the supporting rod 107 passes through the linear bearing 108, and the other end of the supporting rod 107 is fixed with the base 101, so that the mounting plate 102 slides along the supporting rod 107. In this embodiment, the linear bearing 108 is a flange type linear bearing, and is fixed with the mounting plate 102 via a flange therein. It may be understood that the linear bearing 108 may also use a linear bearing in other forms, such as a straight linear bearing.

The mounting plate 102 may be separated into a central portion and a peripheral portion. The through hole may be located on the peripheral portion of the mounting plate 102, and the counterweight 106 and the magnet 104 may be located in the central portion of the mounting plate 102. In this embodiment, the number of the first springs 105 is two, and the two sets of guide structures are symmetrically disposed relative to a central axis of the coil 103. Correspondingly, two supporting rods 107 and two linear bearings 108 are comprised in this embodiment; and correspondingly, two through holes need to be arranged on the mounting plate 102. It may be understood that the guide structures may not be limited to two sets. In other embodiments, three sets, four sets and other sets of guide structures may also be provided.

Further, the number of the first springs 105 is a plurality, and lengths of the first springs 105 are equal. The number of the first springs 105 may be the same as the number of the sets of the guide structures. In this embodiment, the number of the first springs 105 is two. Each first spring 105 disposed coaxially with each supporting rod 107, where an aperture of the first spring 105 is greater than an outer diameter of the supporting rod 107, and the supporting rod 107 is located in the first spring 105.

The seismic vibrator 100 may further comprises the magnetic steel 111, fixed with the magnet 104, wherein a gap for accommodating the coil 103 is arranged between the magnetic steel 111 and the magnet 104. The magnetic steel 111 has strong permeability. In the presence of the magnet 104, the magnetic steel 111 also has the magnetism. The gap is also called as a magnetic gap, a constant magnetic field is present between magnetic gap, so that the magnet 104, the magnetic steel 111 and the coil 103 are jointly formed into a magnetic circuit structure. In order to show the internal structure of the seismic vibrator 100 clearly, the shell 112 and the magnetic steel 111 are hidden for drawing in FIG. 2.

In this embodiment, the base 101 and the mounting plate 102 are a circular plate. Certainly, the base 101 and the mounting plate 102 may also be of other shapes in other embodiments. Preferably, the base 101 and the mounting plate 102 both are of an axially symmetric shape. The supporting rod 107 is perpendicular to the base 101, and the supporting rod 107 is also perpendicular to the mounting plate 102, so that the mounting plate 102 is parallel to the base 101. The mounting plate 102 comprises a first surface facing to the base 101 and a second surface backing to the base 101, the magnet 104 and the magnetic steel 111 are located on the first surface, and the counterweight 106 is located on the second surface. With the cooperation among the first spring 105, the counterweight 106, the supporting rod 107 and the linear bearing 108, the mounting plate 102 make a reciprocating linear motion having a plane parallel to the base 101 all the time and a motion direction perpendicular to the base 101, thus driving the magnet 104 and the magnetic steel 111 to make the same motion.

The seismic vibrator 100 in this embodiment may further comprise: a coil bracket 109 and a spring bracket 110. The coil bracket 109 is configured to fix the coil 103 and the base 101, and the spring bracket 110 is configured to mount the first spring 105 and the base 101. The coil bracket 109 in this embodiment is of a hollow cylindrical shape, the coil bracket 109 is fixed with the base 101, and the coil 103 is winded on an outer circumferential surface of the coil bracket 109. The number of the spring brackets 110 is corresponding to the number of the first springs 105. In this embodiment, two spring brackets 110 are provided, too. Each spring bracket 110 is fixed with the base 101. Certain ends of the first springs 105 are connected to the spring bracket 110, and the other ends of the first springs are connected to the mounting plate 102. The magnet 104 in this embodiment is of a cylindrical shape, the magnetic steel is of a cylindrical shape, and an annular gap is provided between the magnet 104 and the magnetic steel 111. The magnet 104 and the coil 103 are coaxially arranged, and may be disposed on a central axis shared by the base 101 and the mounting plate 102. Furthermore, a movement direction of the magnet 104 is parallel to an axis direction of the coil 103.

A periodic reciprocating motion is made among the magnet 104, the magnetic steel 111 and the coil 103 to generate a sinusoidal output force. By controlling a current flowing through the coil 103 and a frequency of a drive signal, an output force of the seismic vibrator 100 can be controlled.

It is to be noted that, in the above exemplary description of the seismic vibrator 100, the shapes and structures of the seismic vibrator 100 and components comprised therein are described in detail. The shapes and structures of the seismic vibrator 100 and components comprised therein may be not limited to the above situations. For example, the base 101 may also be a square plate and the like, and the shell 112 is a square tube correspondingly and the like.

According to the seismic vibrator 100 provided by the present disclosure, the coil 103 is fixed, and the magnet 104 reciprocates relative to the coil 103, so that the electrical signal in the coil 103 is converted into a mechanical vibration signal to be transmitted in a form of a seismic wave, thus achieving the purpose of replacing an explosive seismic vibrator with a nondestructive seismic vibrator in seismic exploration and making the structure of the seismic vibrator more simpler.

The base 101 is connected to the mounting plate 102 via the first spring 105, and the positions of a plurality of first springs 105 are corresponding to the positions of a plurality of sets of guide structures, i.e., the first springs 105 are symmetrically arranged relative to the central axis of the coil 103, so the mounting plate 102 reciprocates relative to the base 101 more stably, and the working state of the seismic vibrator 100 is more stable.

The shell 112 is covered on the base 101, and jointly formed with the base 101 into a space for accommodating the internal structure of the seismic vibrator 100, thus providing a better protection effect for the internal structure of the seismic vibrator 100.

Figure 4:
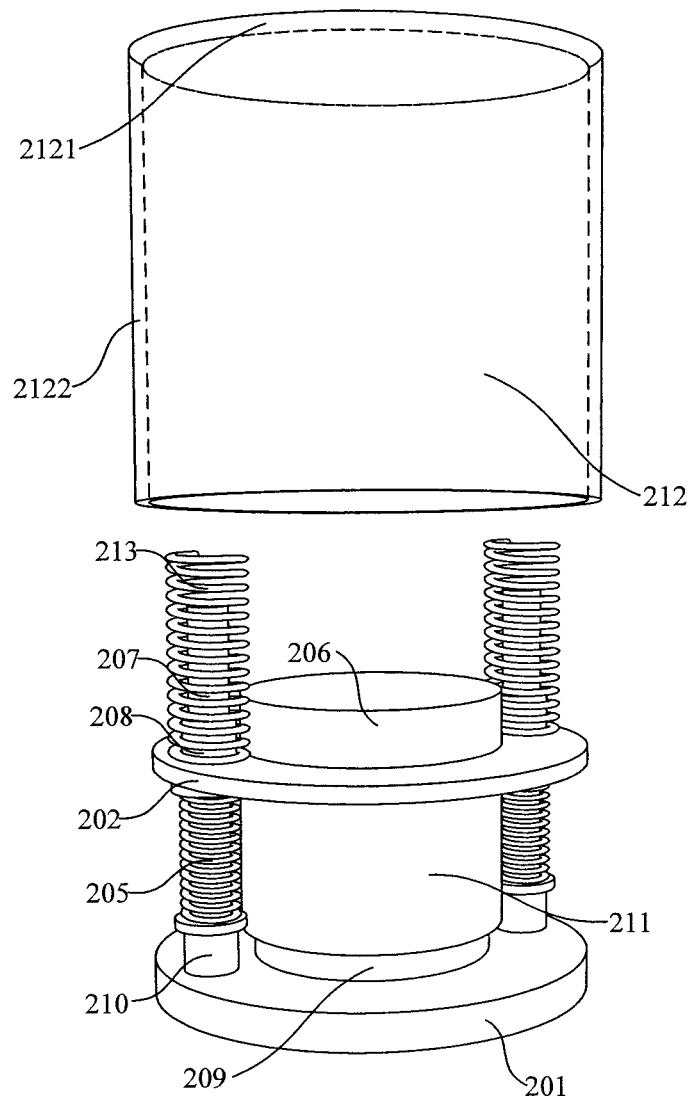
FIG. 4 is a stereoscopic view of the seismic vibrator according to a second embodiment of the present disclosure.

FIG. 4 is a stereoscopic view of a seismic vibrator according to a second embodiment of the present disclosure. The seismic vibrator 200 in the second embodiment comprises a base 201, a mounting plate 202, a coil, a magnet, a first spring 205 and a counterweight 206. The arrangement manners of the above structures may be the same as the first embodiment and will not be described in detail herein. The seismic vibrator 200 may further comprise: a shell 212, a magnetic steel 211, a coil bracket 209, a spring bracket 210 and at least one set of guide structures. Each set of guide structures comprises a supporting rod 207 and a linear bearing 208. The arrangement manners of the above structures may also be the same as the first embodiment and will not be described in detail herein. In order to show an internal structure of the seismic vibrator 200 in the figure, the shell 212 and the base 201 are separated for drawing.

The shell 212 comprises a top surface 2121 opposite to the base 201 and a lateral surface 2122 located between the top surface 2121 and the base. Different from the first embodiment, the seismic vibrator 200 further comprises second springs 213, and the mounting plate 202 is connected to the top surface 2121 of the shell 212 via the second springs 213. Preferably, the number of the second springs 213 is corresponding to the number of the sets of guide structures. In this embodiment, two second springs 213 are provided, each second spring 213 disposed coaxially with each supporting rod 207, apertures of the second springs 213 are greater than outer diameters of the supporting rods 207 and greater than outer diameters of the linear bearings 208, and the supporting rods 207 are located in the second springs 213.

According to the seismic vibrator 200 provided by this embodiment, the mounting plate 202 is connected to the base 201 via the first springs 205 and further connected to the top surface 2121 of the shell 212 via the second springs 213. Therefore, when the mounting plate 202 drives the magnet and the magnetic steel to reciprocate, the structure of the whole seismic vibrator 200 is more stable.

Figure 5:
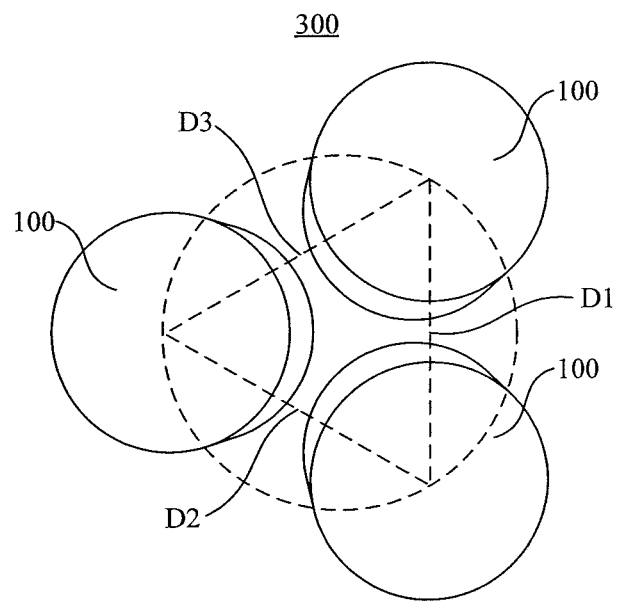
FIG. 5 is a top view of a vibration device according to an embodiment of the present disclosure.
Figure 6:
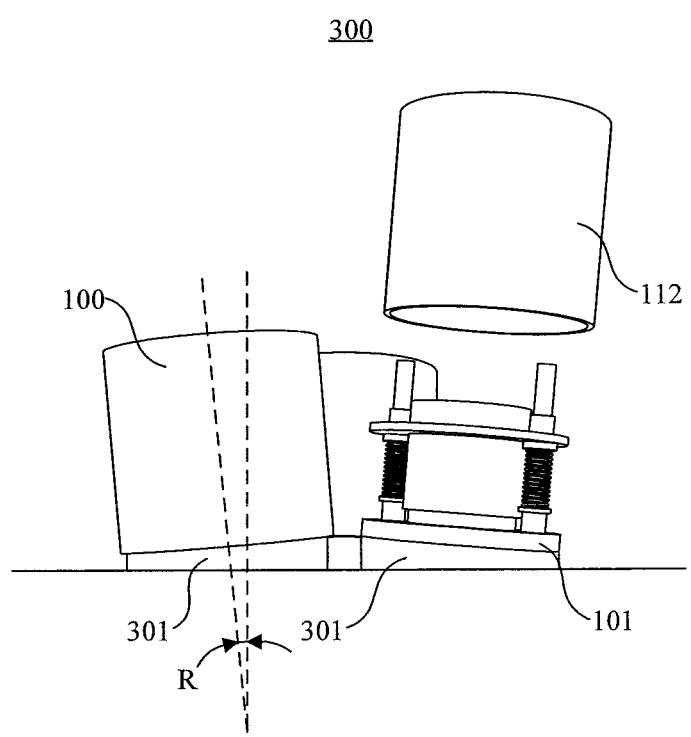
FIG. 6 is a front view of the vibration device according to an embodiment of the present disclosure.
Figure 7:
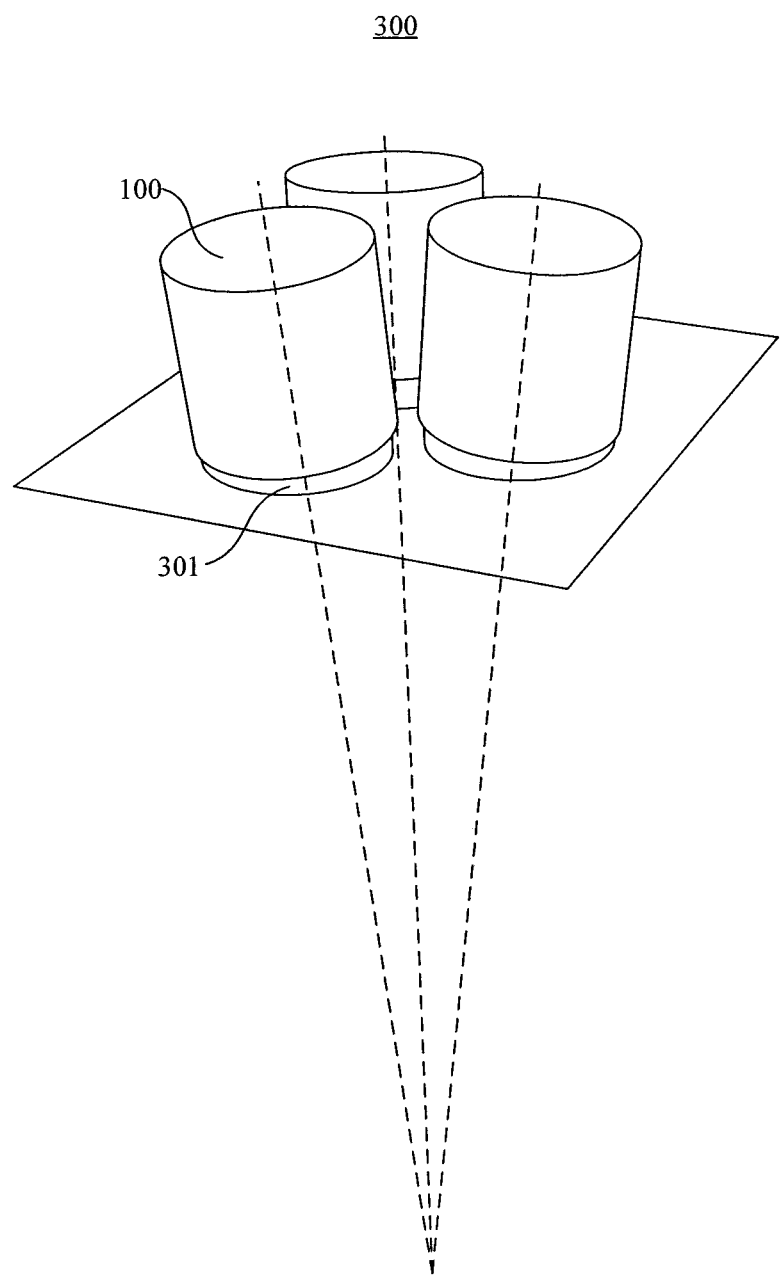
FIG. 7 is a stereoscopic view of the vibration device according to an embodiment of the present disclosure.

FIG. 5 to FIG. 7 are a top view, a front view and a stereoscopic view of a vibration device 300 according to an embodiment of the present disclosure. The vibration device 300 comprises a plurality of seismic vibrators 100 in the first embodiment, and adjustable bases 301 disposed below each seismic vibrator 100, and each of the adjustable base 301 is configured to adjust a position as well as inclination angle and direction of each seismic vibrator 100. The vibration device 300 may also comprise the seismic vibrator in other embodiments, for example, the seismic vibrator 200 in the second embodiment of the present disclosure, or even the seismic vibrator 400 or 500 described below.

Preferably, three controllable seismic vibrators 100 are provided in this embodiment. In the top view as shown in FIG. 5, the adjustable bases 301 are arranged so that plurality of the seismic vibrators 100 are equidistantly distributed on a same circumference in a same horizontal plane. The horizontal circumference is shown as a dotted line in the figure. Centers of the three seismic vibrators 100 are located on the horizontal circumference, and a mutual distance among the three seismic vibrators 100 is D1=D2=D3. In the front view as shown in FIG. 6, inclination angles of central axes of plurality of the seismic vibrators 100 relative to a vertical direction are the same, where a central axis and a vertical line of one seismic vibrator 100 are shown in the dotted line. Preferably, the inclination angles R of the central axes of plurality of the seismic vibrators 100 relative to the vertical direction are 5° respectively. In the stereoscopic view as shown in FIG. 7, the central axes of plurality of the seismic vibrators 100 are shown as the dotted line. Preferably, extension directions of the central axes of plurality of the seismic vibrators 100 are intersected into one point.

According to the vibration device based on vector synthesis of the seismic wave provided by the present disclosure, the seismic vibrators 100 are fixed with the adjustable bases 301, and the seismic vibrators 100 are coupled with a to-be-detected mechanism to transmit the seismic wave to the to-be-detected mechanism. The to-be-detected mechanism may be a ground, a tunnel, a bridge or a road, etc. The number of the seismic vibrators 100 a plurality. The adjustable bases 301 may adjust positions of the seismic vibrators 100 as well as inclination angles and directions of the seismic vibrators 100. In a preferred embodiment, extension directions of central axes of plurality of the seismic vibrators 100 are intersected into one point. By controlling amplitude of output force of plurality of the seismic vibrators 100, a vector is synthesized and a seismic wave is output, so that the vibration device has a directional detecting excitation capability.

The adjustable bases 301 may adjust the positions as well as the inclination angles and directions of the seismic vibrators 100, so directions in which plurality of the seismic vibrators 100 output the seismic waves and the synthesis manners of a plurality of seismic waves may be adjusted conveniently, and thus the vibration device can be adapted to exploring the to-be-detected mechanism in more different situations conveniently.

The number of the seismic vibrators of the vibration device can be adjusted, and each seismic vibrator may be selected in terms of an actual demand By adjusting the number of the seismic vibrators of the vibration device to cooperate with the adjustable bases, the amplitude and direction of the output force of the vibration device may be diverse. With the seismic waves output by the synthesizing vector, the vibration device has the directional detecting excitation capability and the adaptability of exploring different to-be-detected mechanisms is also stronger.

In this embodiment of the present disclosure, the coil is fixed, and the magnet reciprocates relative to the coil, so that an electrical signal in the coil is converted into a mechanical vibration signal to be transmitted in a form of a seismic wave, thus achieving the purpose of replacing an explosive seismic vibrator with a nondestructive seismic vibrator in seismic exploration and making the structure of the seismic vibrator more simpler. With the cooperation between the spring and the counterweight, the overall stability of the seismic vibrator is stronger.

The base is connected to the mounting plate via the first spring, and the positions of a plurality of first springs are corresponding to the positions of a plurality of sets of guide structures, i.e., the first springs are symmetrically arranged relative to the central axis of the coil, so the mounting plate reciprocates relative to the base more stably, and the working state of the seismic vibrator is more stable.

The shell is covered on the base, and jointly formed with the base into a space for accommodating the internal structure of the seismic vibrator, thus providing a better protection effect for the internal structure of the seismic vibrator.

The mounting plate is connected to the base via the first spring and connected to the top surface of the shell via the second spring, so that when the mounting plate drives the magnet and the magnetic steel to reciprocate, the structure of the whole seismic vibrator is more stable.

According to the vibration device provided by the present disclosure, with the adjustable bases, the seismic vibrators are fixed and the seismic vibrators are coupled to the to-be-detected mechanism, to transmit a mechanical vibration signal to the to-be-detected mechanism, where plurality of seismic vibrators are provided, and the adjustable bases may adjust positions of the seismic vibrators as well as inclination angles and directions of the seismic vibrators. In a preferred embodiment, extension directions of central axes of plurality of the seismic vibrators are intersected into one point. By controlling an amplitude of an output force of plurality of seismic vibrators, a vector is synthesized and a seismic wave is output, so that the vibration device has a directional detecting excitation capability.

The adjustable bases may adjust the positions as well as the inclination angles and directions of the seismic vibrators, so directions in which plurality of the seismic vibrators output the seismic waves and the synthesis manners of plurality of seismic waves may be adjusted conveniently, and thus the vibration device can be adapted to exploring the to-be-detected mechanism in more different situations conveniently.

The number of the seismic vibrators of the vibration device can be adjusted, and each seismic vibrator may be selected in terms of an actual demand By adjusting the number of the seismic vibrators of the vibration device to cooperate with the adjustable bases, the amplitude and direction of the output force of the vibration device may be diverse. And thanks to the seismic waves output by the synthesizing vector, the vibration device has the directional detecting excitation capability and the adaptability of exploring different to-be-detected mechanisms is also stronger.

Figure 8:
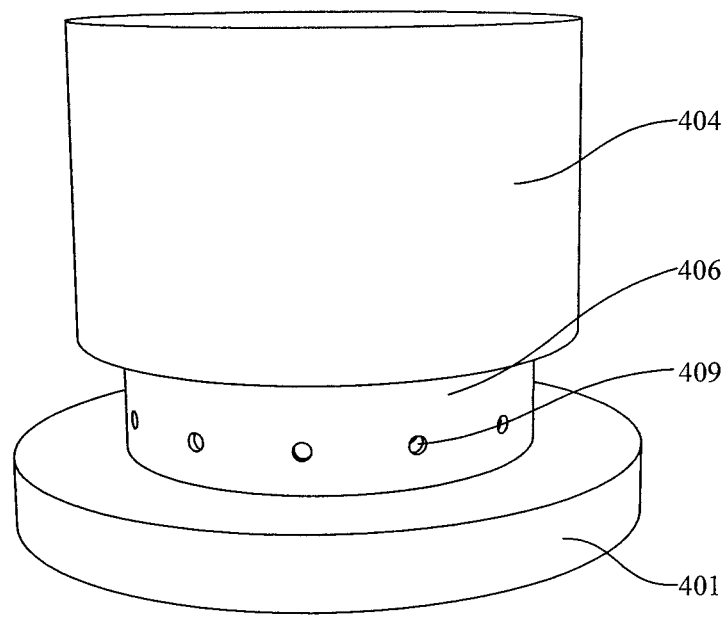
FIG. 8 is a stereoscopic view of the seismic vibrator according to a third embodiment of the present disclosure.
Figure 9:
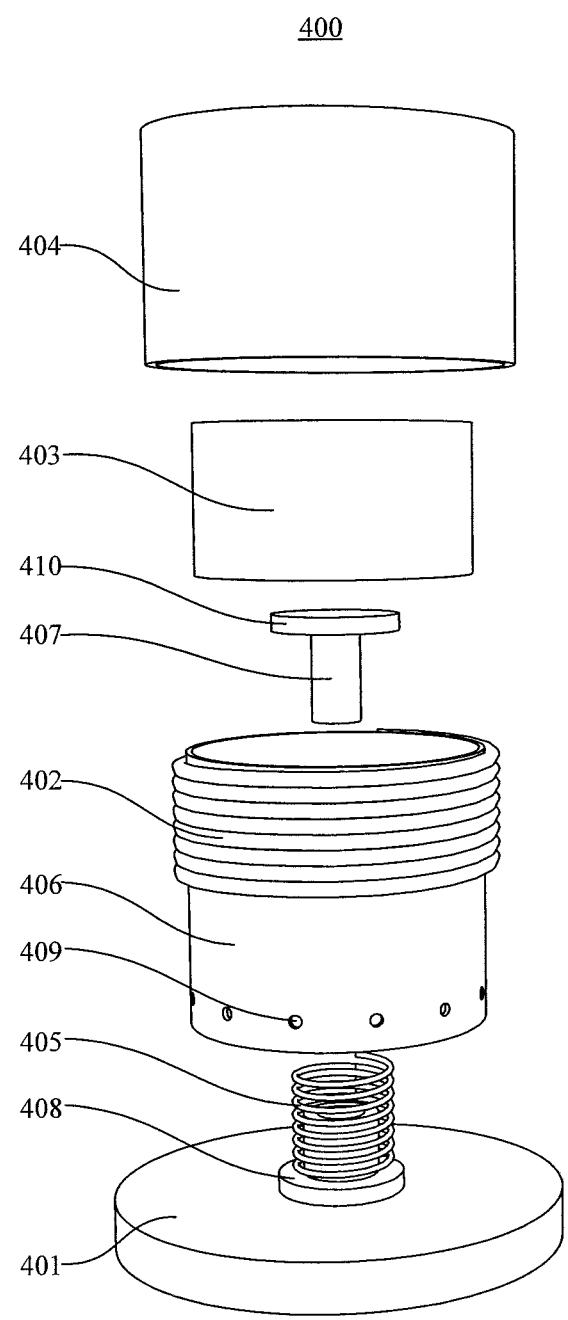
FIG. 9 is a stereoscopic exploded diagram of the seismic vibrator according to the third embodiment of the present disclosure.
Figure 10:
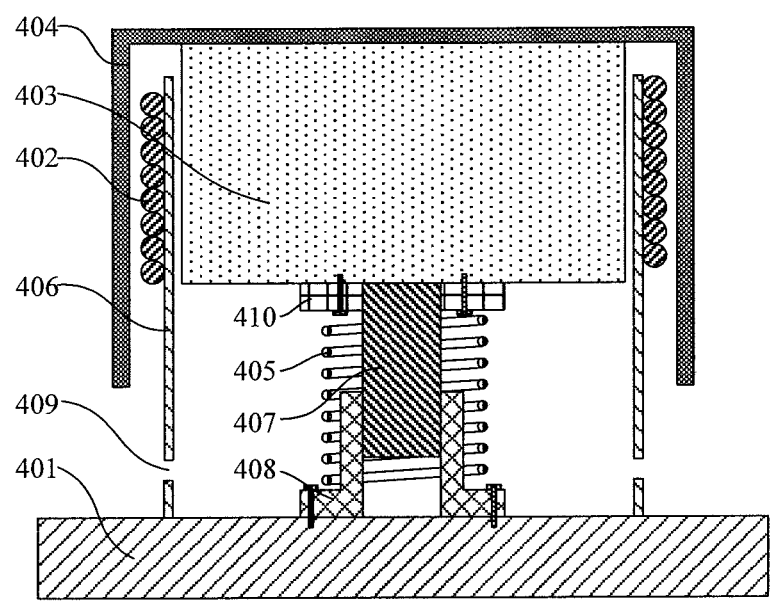
FIG. 10 is a sectional view of the seismic vibrator according to the third embodiment of the present disclosure.

FIG. 8 and FIG. 9 are stereoscopic views and a stereoscopic exploded diagram of a seismic vibrator according to a third embodiment of the present disclosure. FIG. 10 is a sectional view of the seismic vibrator. The seismic vibrator 400 comprises: a base 401, a coil 402, a magnet 403, a magnetic steel 404 and a spring 405. The coil 402 is fixed on the base 401, and the magnetic steel 404 is fixed with the magnet 403. The magnet 403 and/or the magnetic steel 404 is connected to the base 401 via the spring 405, so that the magnet 403 and the magnetic steel 404 reciprocates relative to the coil 402. According to the seismic vibrator provided by the present disclosure, the coil 402 is fixed, and the magnet 403 and the magnetic steel 404 reciprocate relative to the coil 402, so that an electrical signal in the coil 402 is converted into a mechanical vibration signal to be transmitted in a form of a seismic wave, thus achieving the purpose of replacing an explosive seismic vibrator with a nondestructive seismic vibrator in seismic exploration and making the structure of the seismic vibrator more simpler.

The coil 406 is often an enameled wire and is winded in a form of a cylindrical spiral wire. An electrical signal can be charged to the interior of the coil 406. The seismic vibrator 400 may further comprise a coil bracket 406, configured to fix the coil 402 and the base 401. In this embodiment, the coil bracket 406 is of a hollow cylindrical shape, the coil bracket 406 is fixed with the base 401, with an axis perpendicular to a mounting plane of the base 401, and the coil 402 is winded on an outer circumferential surface of the coil bracket 406.

The magnet 403 may be made of various alloy permanent magnet materials or various ferrite permanent magnet materials. The magnetic steel 404 has strong permeability. In the presence of the magnet 403, the magnetic steel 404 also has the magnetism. In this embodiment, the magnetic steel 404 is of a hollow cylindrical shape having an opened end and a sealed end. The magnet 403 is of a cylindrical shape, and passes through the opened end of the magnetic steel 404 to fix with the sealed end of the magnetic steel 404. Preferably, an outer diameter of the magnet 403 is smaller than an inner diameter of the magnetic steel 404, so that a gap is provided between an outer circumferential surface of the magnet 403 and an inner circumferential surface of the magnetic steel 404; and the gap is corresponding to the coil 402 so that can accommodate the coil 402. The gap is also referred to as a magnetic gap, so that a constant magnetic field is formed between the magnet 403 and the magnetic steel 404. The magnet 403, the magnetic steel 404 and the coil 402 are jointly formed into a magnetic circuit structure. Since there is the electrical signal in the coil 402, the electromagnetism is produced via a spiral structure. As the position of the coil 402 is fixed, the magnet 403 and the magnetic steel 404 reciprocates periodically relative to the coil 402 to generate a sinusoidal output force. By controlling a current flowing through the coil 402 and a frequency of a drive signal, an output force of the seismic vibrator 400 can be controlled.

The seismic vibrator 400 may further comprise at least one set of guide structures, where each set of guide structures comprises a supporting rod 407 and a linear bearing 408. The linear bearing 408 may be a flange type linear bearing. A flange is fixed with the base via a bolt, so that the linear bearing 408 is mounted on the base 401. One end of the supporting rod 407 is fixed with the magnet 403 and/or the magnetic steel 404, and the other end of the supporting rod 407 penetrates into the linear bearing 408. A certain space is kept between the end, penetrating into the linear bearing 408, of the supporting rod 407 and the base 401, so that the magnet 403 and the magnetic steel 404 can slide along the supporting rod 407.

In this embodiment, one set of guide structures is provided, and is located on a central axis of the coil bracket 406. The coil 402, the magnet 403, the magnetic steel 404, the supporting rod 407 and the linear bearing 408 are coaxially arranged. The number of the springs 405 is the same as the number of the sets of guide structures, and the number of the spring 405 is one. The spring 405 and the supporting rod 407 are coaxially arranged. An inner diameter of the spring 405 is greater than an outer diameter of the supporting rod 407 and a pipe diameter of the linear bearing 408, so that the supporting rod 407 is located in the spring 405. Therefore, the overall structure of the seismic vibrator may be more stable, and the natural frequency of the seismic vibrator is optimized. It may be understood that the number of the sets of guide structures may also be other figures, and the spring 405 may also not be arranged coaxially corresponding to the supporting rod 407. In addition, in this embodiment, a flange 410 may be provided between the supporting rod 407 and the magnet 403 for connection, where the flange 410 may be fixed with the magnet 403 via a bolt, and one end of the spring 405 contacts with the flange 410, and the other end of the spring 405 contacts with the flange of the linear bearing 408 fixed on the base 401, so that the magnet 403 is connected to the base 401. However, the manner that the magnet 403 and/or the magnetic steel 404 is connected to the base 401 via the spring 405 may not be limited thereto.

Further, at least one through hole communicating with an interior and an exterior of the coil bracket 406 is provided on the base 401 and/or the coil bracket 406. In this embodiment, a through hole 409 is provided on a portion, close to the base 401, of the coil bracket 406, there are a plurality of through holes 409, and plurality of the through holes 409 are distributed on the coil bracket 409 in a manner of homogeneously radiating to the four sides with the central axis of the coil bracket 406 as a center. When a current is charged to the coil 402, a part of heat is produced by the coil 402 in the production of the electromagnetism to affect the working stability of the seismic vibrator. By arranging the through hole 409 communicating the interior and exterior of the coil bracket 406, the air circulation between the interior and exterior of the coil bracket 406 may be facilitated, the interior of the coil bracket 406 can be cooled, and problem of partial heating of the coil 402 is alleviated. On the basis of this embodiment, a gas delivery apparatus may be connected to the through hole 409 to enhance the circulation of a gas and achieve a better cooling effect.

According to this embodiment, the magnet 403 is connected to the base 401 via the spring 405, and the magnetic steel 404 is also fixed with the magnet 403, so while the magnet 403 and the magnetic steel 404 reciprocates relative to the coil 402, the number of the applied springs may be reduced. In this embodiment, only one spring is used to save the manufacture cost of the seismic vibrator. Meanwhile, the spring 405 and the guide structures are arranged on the central axis of the coil bracket 406, and the coil 402, the magnet 403, the magnetic steel 404, the guide structures and the spring 405 are coaxially arranged, so that the overall structure of the seismic vibrator is more stable, and the natural frequency for outputting a vibration wave when the seismic vibrator vibrates is optimized. By arranging the through hole 409 communicating the interior and exterior of the coil bracket 406, the air circulation between the interior and exterior of the coil bracket 406 may be facilitated, the interior of the coil bracket 406 can be cooled, and problem of partial heating of the coil 402 is alleviated.

Figure 11:
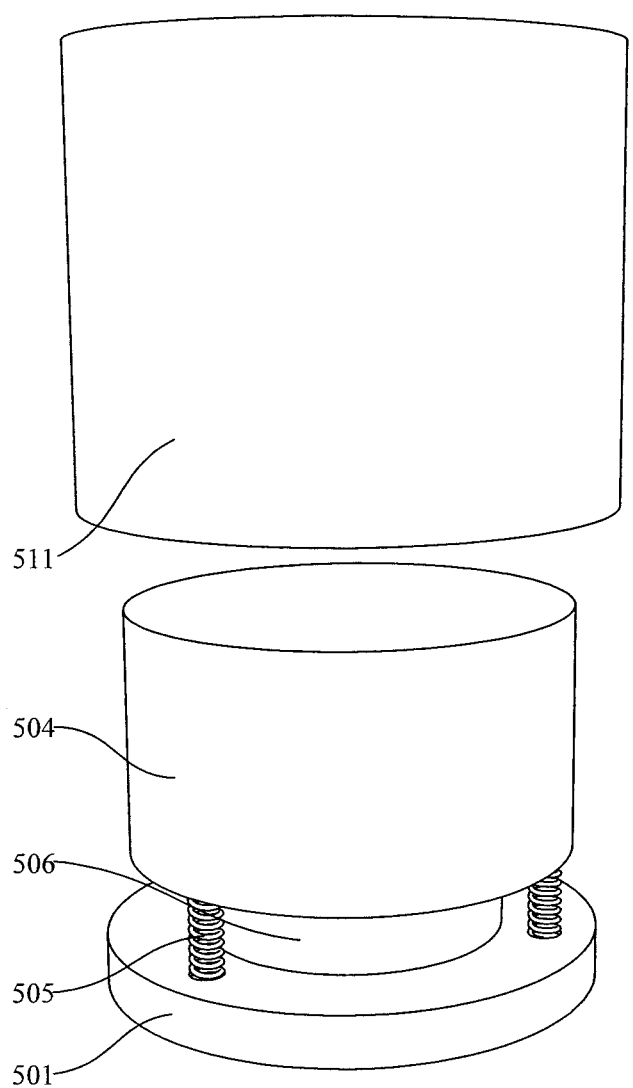
FIG. 11 is a stereoscopic view of a seismic vibrator according to a fourth embodiment of the present disclosure.
Figure 12:
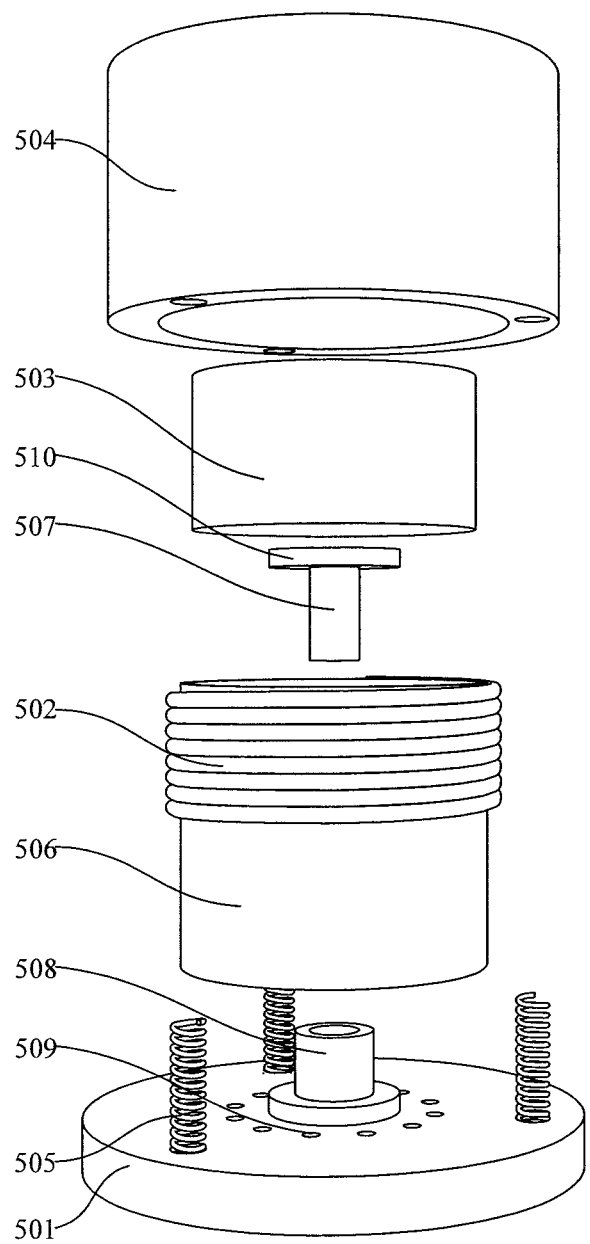
FIG. 12 is an exploded stereoscopic diagram of the seismic vibrator according to the fourth embodiment of the present disclosure.
Figure 13:
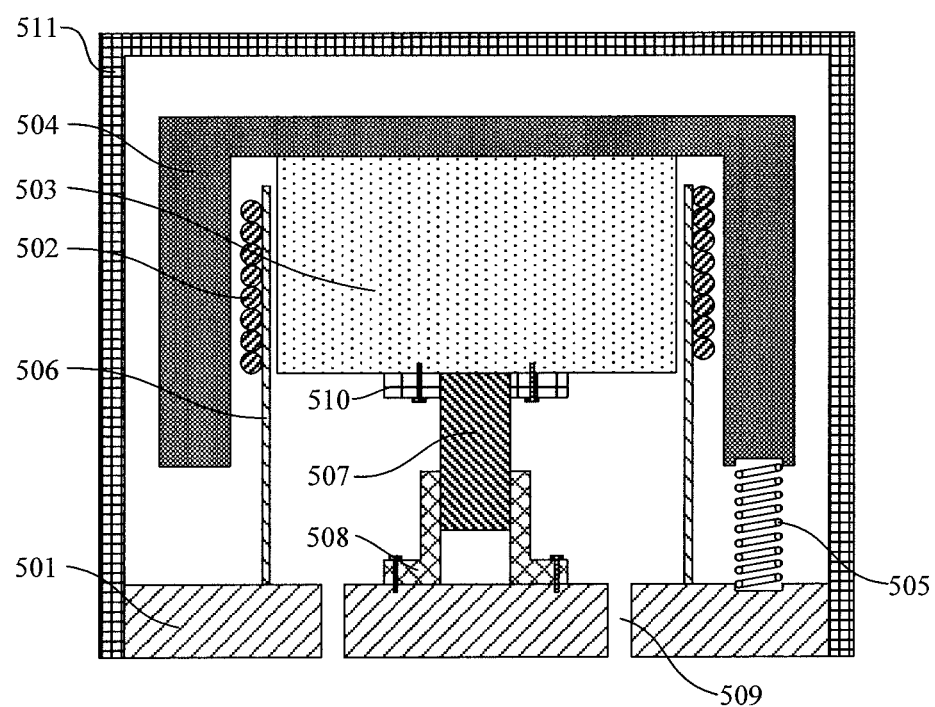
FIG. 13 is a sectional view of the seismic vibrator according to the fourth embodiment of the present disclosure.

FIG. 11 and FIG. 12 are stereoscopic views and a stereoscopic exploded diagram of a seismic vibrator according to a fourth embodiment of the present disclosure. FIG. 13 is a sectional view of a seismic vibrator. The seismic vibrator 500 comprises: a base 501, a coil bracket 506, a coil 502, a magnet 503, a magnetic steel 504 and a spring 505. The coil bracket 506 is of a hollow cylindrical shape. The coil 502 is winded on an outer circumferential surface of the coil bracket 506, and is fixed to the base 501 via the coil bracket 506. The magnetic steel 504 is fixed with the magnet 503. The magnet 503 and/or the magnetic steel 504 is connected to the base 501 via the spring 505, so that the magnet 503 and the magnetic steel 504 reciprocates relative to the coil 502. According to the seismic vibrator provided by the present disclosure, the coil 502 is fixed, and the magnet 503 and the magnetic steel 504 reciprocate relative to the coil 502, so that an electrical signal in the coil 502 is converted into a mechanical vibration signal to be transmitted in a form of a seismic wave, thus achieving the purpose of replacing an explosive seismic vibrator with a nondestructive seismic vibrator in seismic exploration and making the structure of the seismic vibrator more simpler.

The magnetic steel 504 is of a hollow cylindrical shape having an opened one end and a sealed end. The magnet 503 is of a cylindrical shape, and passes through the opened end of the magnetic steel 504 to fix with the sealed end of the magnetic steel 504. Preferably, an outer diameter of the magnet 503 is smaller than an inner diameter of the magnetic steel 504, so that a gap is provided between an outer circumferential surface of the magnet 503 and an inner circumferential surface of the magnetic steel 504; and the gap is corresponding to the coil 502, and can accommodate the coil 502. The gap is also referred to as a magnetic gap, so that a constant magnetic field is formed between the magnet 503 and the magnetic steel 504. The magnet 503, the magnetic steel 504 and the coil 502 are jointly formed into a magnetic circuit structure. The coil 502 has the electrical signal, so the electromagnetism is produced via a spiral structure. As the position of the coil 502 is fixed, the magnet 503 and the magnetic steel 504 reciprocates periodically relative to the coil 502 to generate a sinusoidal output force. By controlling a current flowing through the coil 502 and a frequency of a drive signal, an output force of the seismic vibrator 500 can be controlled.

Different from the first embodiment, a plurality of springs 505 are provided in this embodiment, and the magnetic steel 504 are jointly connected to the base 501 via plurality of the springs 505. Plurality of the springs 505 are uniformly distributed on the opened end of the magnetic steel 504; and certain ends of the springs 505 are connected to the magnetic steel 504, and the other ends of the springs 505 are connected to the base 501. In this embodiment, the base 501, the coil bracket 506, the coil 502, the magnet 503 and the magnetic steel 504 are coaxially arranged, three springs 505 are provided and distributed on a circle with a central axis of the magnetic steel 504 as a center, and a mutual comprised angle from the three springs 505 to the center is 120°. Plurality of the springs 505 have the same specification, so that the structure of the seismic vibrator is more stable, and the natural frequency for outputting a vibration wave when the seismic vibrator vibrates is optimized.

The seismic vibrator further comprises at least one set of guide structures, where each set of guide structures comprises a supporting rod 507 and a linear bearing 508. The arrangement of the guide structures in this embodiment is approximately the same as that in the first embodiment. The linear bearing 508 is fixed on the base 501. One end of the supporting rod 507 is fixed with the magnet 503 via a flange 510, and the other end of the supporting rod 507 penetrates into the linear bearing 508. A certain space is kept between the end, penetrating into the linear bearing 508, of the supporting rod 507 and the base 501, so that the magnet 503 and the magnetic steel 504 can slide along the supporting rod 507.

According to the present disclosure, at least one through hole communicating with an interior and an exterior of the coil bracket 506 is provided on the base 501 and/or the coil bracket 506. Different from the first embodiment, through holes 509 are provided on the base 509, and there are a plurality of through holes 509. The base 501 comprises a first surface facing to the coil 502 and a second surface backing to the coil 502. Each through hole comprises a first opening located on the first surface of the base 501 and a second opening located on the second surface of the base 501, where the first opening may be provided in the coil bracket 506; and plurality of the through holes 509 are uniformly distributed on a same circumference with the central axis of the coil 502 as a center. When a current is charged to the coil 502, a part of heat is produced by the coil 502 in the production of the electromagnetism to affect the working stability of the seismic vibrator. By arranging the through holes 509 communicating the interior and exterior of the coil bracket 506, the air circulation between the interior and exterior of the coil bracket 506 may be facilitated, the interior of the coil bracket 506 can be cooled, and problem of partial heating of the coil 502 is alleviated. On the basis of this embodiment, a gas delivery apparatus may be connected at the second opening of each through hole 509 to enhance the circulation of a gas and achieve a better cooling effect. In addition, in other embodiments, the through hole may also be provided on a portion, located outside the coil bracket 506, of the base 501, and the through hole may further be provided on the coil bracket 506. It may be understood that there may be plurality of through holes and may also be a single through hole.

In addition, in this embodiment, the seismic vibrator 500 further comprises a shell 511 covered on the base 501. The shell 511 is a hollow cylindrical shape having a bottom on one side, and forms a space with the base 501 for accommodating an internal structure of the seismic vibrator 500, thus providing a better protection effect for the internal structure of the seismic vibrator 500.

According to this embodiment, the magnet 504 is connected to the base 501 via plurality of springs 505, and the magnetic steel 504 is also fixed with the magnet 503, so the magnet 503 and the magnetic steel 504 reciprocates relative to the coil 502 in cooperation with the guide structures. Plurality of the springs 505 are distributed on a circle having a central axis of the magnetic steel 504 as a center and the comprised angles from the springs 505 to the center are the same, so that the overall structure of the seismic vibrator is more stable, and the natural frequency for outputting a vibration wave when the seismic vibrator vibrates is optimized. By arranging the through hole 509 communicating the interior and exterior of the coil bracket 506, the air circulation between the interior and exterior of the coil bracket 506 may be facilitated, the interior of the coil bracket 506 can be cooled, and problem of partial heating of the coil 502 is alleviated.

In this embodiment of the present disclosure, by arranging the springs to directly connect the magnet and/or the magnetic steel to the base, the magnet and the magnetic steel can reciprocate relative to the coil, the number of the springs may be reduced, and the natural frequency of the electromagnetic controllable seismic vibrator is also optimized.

As the through hole communicating the interior and exterior of the coil bracket is provided on the base and/or the coil bracket, the air circulation of the interior of the coil bracket with the outside may be facilitated, the interior of the coil bracket can be cooled, and problem of partial heating of the coil is alleviated.

The seismic vibrator further comprises guide structures. One set of guide structures is provided and coaxially arranged with the coil bracket. At this time, since the number of the springs is corresponding to the number of the sets of guide structures, the magnet and the magnetic steel reciprocates relative to the coil via only one spring and thus the number of the springs is saved. In addition, the spring disposed coaxially with a supporting rod of the guide structures, where the supporting rod is located in the spring, and the position of the spring also corresponds to the central axis of the coil bracket. If the coil, the magnet and the magnetic steel are coaxially arranged and the spring is located on a central axis thereof, the overall structure of the seismic vibrator is more stable, and the natural frequency of the electromagnetic controllable seismic vibrator can be optimized.

In this embodiment of the present disclosure, a gap is provided between an outer circumference of the magnet and an inner circumference of the magnetic steel, and the gap is corresponding to the coil, and can accommodate the coil. The gap is also referred to as a magnetic gap, so that a constant magnetic field is formed between the magnet and the magnetic steel. The magnet, the magnetic steel and the coil are jointly formed into a magnetic circuit structure. Plurality of springs are provided and uniformly distributed on an opened end of the magnetic steel to connect the magnetic steel to the base, so that the overall structure of the seismic vibrator is more stable, and the natural frequency of the electromagnetic controllable seismic vibrator can be optimized.

The present disclosure further provides a driving apparatus and a SEISMIC WAVE GENERATION DEVICE. An acceleration sensing module and a force sensing module mounted on a seismic vibrator form a double closed-loop control loop. The acceleration information obtained by the acceleration sensing module can reflect a control force generated by the seismic vibrator separately, and the output force information obtained by the force sensing module can reflect an output force applied by the seismic vibrator onto a to-be-detected surface in fact. By driving the seismic vibrator with the consideration to the control force and a driving force, the driving accuracy may be improved.

Figure 14:
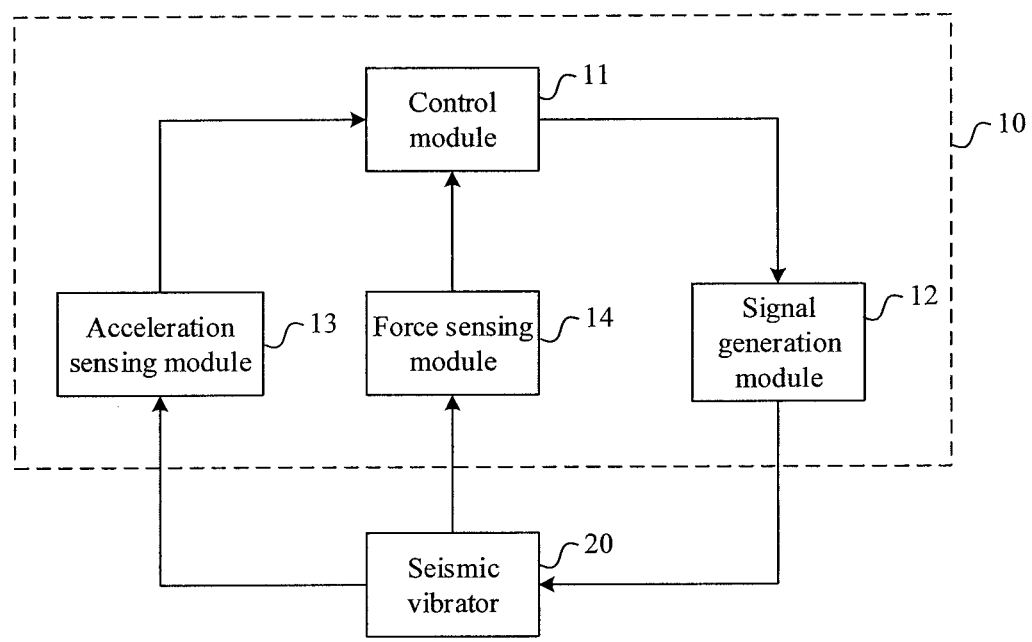
FIG. 14 is a block diagram of a SEISMIC WAVE GENERATION DEVICE according to an embodiment of the present disclosure.

FIG. 14 is a block diagram of a SEISMIC WAVE GENERATION DEVICE according to an embodiment of the present disclosure. As shown in FIG. 14, the SEISMIC WAVE GENERATION DEVICE comprises a driving apparatus 10 and a seismic vibrator 20.

The seismic vibrator 20 may vibrate according to a control signal provided by the driving apparatus 10 to generate a seismic wave. In some embodiments, the seismic vibrator 20 may be any above-described seismic vibrator, such as the seismic vibrator 100, 200, 400 or 500. In some embodiments, the seismic vibrator 20 may be the above-described vibration device 300, where the driving apparatus 10 is connected to each seismic vibrator in the vibration device 300 to control each seismic vibrator to vibrate, thus generating the seismic wave.

The driving apparatus 10 may comprise a control module 11, a signal generation module 12, an acceleration sensing module 13 and a force sensing module 14. The acceleration sensing module 13 is mounted on the seismic vibrator 20, and is configured to sense an acceleration of the seismic vibrator 20 to obtain acceleration information of the seismic vibrator 20. The force sensing module 14 is mounted on the seismic vibrator 20, and is configured to sense an output force generated by vibration of the seismic vibrator 20 to obtain output force information of the seismic vibrator 20. The driving apparatus 10 may generate a control instruction according to a relevant parameter (comprising a driving mode and a driving parameter) input by a user, and send the control instruction to the signal generation module 12 in work. The signal generation module 12 generates a control signal according to the control instruction, and provides the control signal for the seismic vibrator 20. Upon the reception of the control signal, the seismic vibrator 20 converts the control signal in a form of an electrical signal into mechanical vibration, for example, the seismic vibrator 20 may vibrate according to a driving mode, a driving parameter and the like designated in the control signal, to generate a seismic wave that meets a requirement of the user. The acceleration sensing module 13 and the force sensing module 14 mounted on the seismic vibrator 20 may respectively sense the acceleration information and the output force information of the seismic vibrator 20 and provide the acceleration information and the output force information for the control module 11. The control module 11 may adjust the control instruction according to either or both of the acceleration information and the output force information. For example, the control module 11 may calculate, according to the acceleration information, a magnitude of a control force generated separately by the seismic vibrator 20. When the magnitude of the control force exceeds a preset threshold range, the control force is adjusted to the threshold range by adjusting the control signal. The control module 11 may further directly obtain or calculate to obtain, according to the output force information, a magnitude of an output force of the seismic vibrator 20 actually acted on a to-be-detected surface. When the magnitude of the control force exceeds a preset threshold range, the control force is adjusted to the threshold range by adjusting the control signal. Certainly, the control module 11 may also adjust the control signal according to a combination of the acceleration information and the output force information to adjust a vibration characteristic of the seismic vibrator 20.

Figure 15:
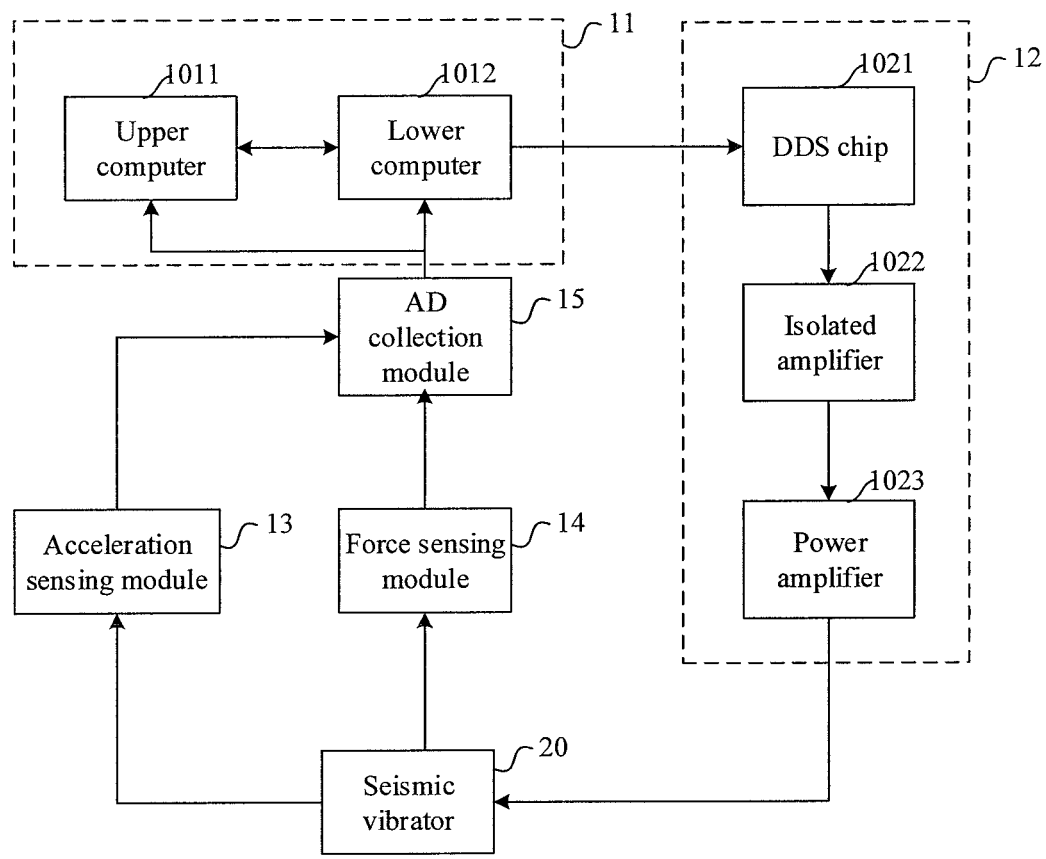
FIG. 15 is a block diagram of the SEISMIC WAVE GENERATION DEVICE according to an embodiment of the present disclosure.

FIG. 15 is a block diagram of a SEISMIC WAVE GENERATION DEVICE based on interface compensation according to an embodiment of the present disclosure.

Figure 16:
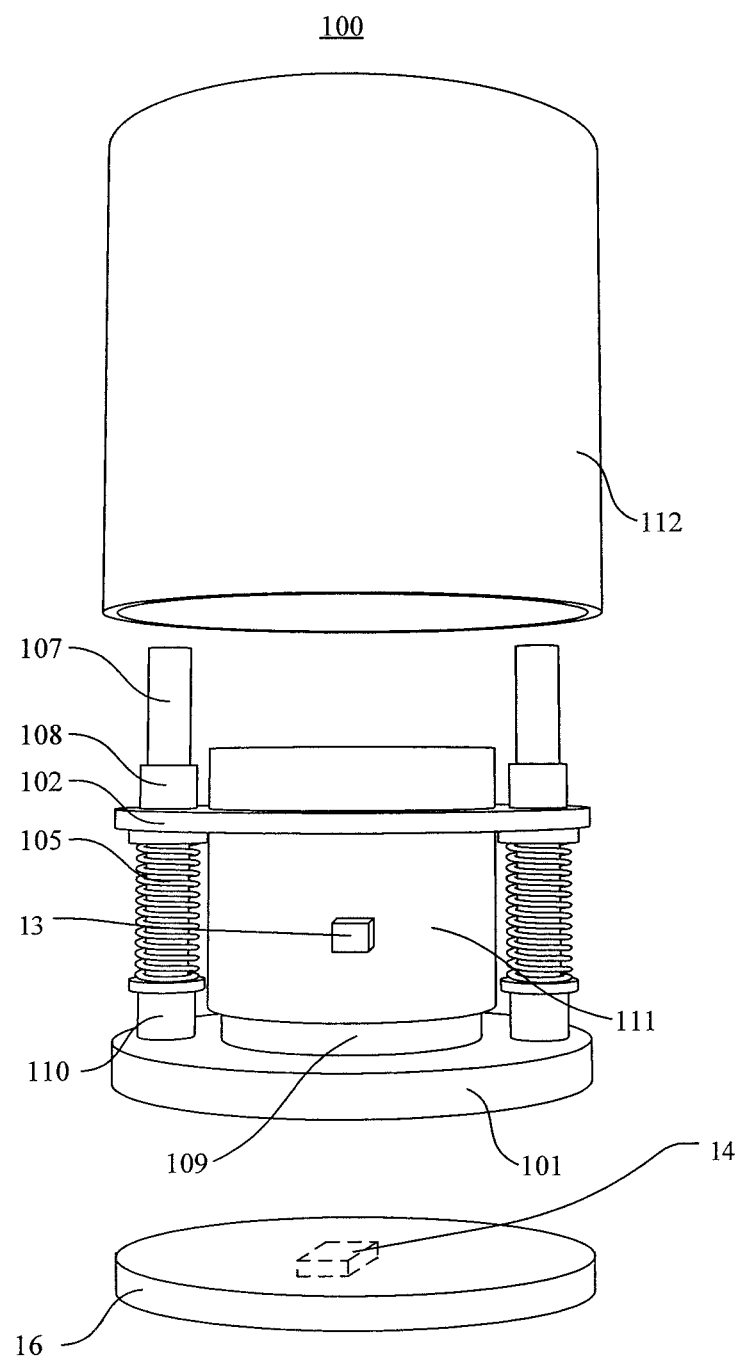
FIG. 16 is a block diagram of an example of positions of an acceleration sensing module and a force sensing module on the seismic vibrator in the SEISMIC WAVE GENERATION DEVICE according to an embodiment of the present disclosure.

As shown in FIG. 15, the SEISMIC WAVE GENERATION DEVICE based on the interface compensation comprises a driving apparatus 10 and a seismic vibrator 20. The driving apparatus 10 may comprise a control module 11, a signal generation module 12, an acceleration sensing module 13, a force sensing module 14 and an analog-digital (AD) conversion module 15. The seismic vibrator 20 may vibrate according to a control signal provided by the driving apparatus 10 to generate a seismic wave. FIG. 16 is a structural diagram of an example of mounting positions of an acceleration sensing module 13 and a force sensing module 14 on a seismic vibrator 20 according to an embodiment of the present disclosure. In the example shown in FIG. 16, the seismic vibrator 20 is an electromagnetic controllable seismic vibrator 100 described with reference to FIG. 1 to FIG. 3.

Referring back to FIG. 15, the control module 11 may comprise an upper computer 1011 and a lower computer 1012. The upper computer 1011 may be achieved by a computer. The lower computer 1012 may be achieved by a single chip microcomputer, such as an STM32 single chip microcomputer. The upper computer 1011 and the lower computer 1012 may be connected via a serial port.

The signal generation module 12 may comprise a DDS chip 1021, an isolated amplifier 1022 connected to the DDS chip 1021, and a power amplifier 1023 connected to the isolated amplifier 1022.

The acceleration sensing module 13 may comprise one or more acceleration sensors that may be mounted on a side, a top or a bottom of a forcer (such as a magnetic steel 111) of the seismic vibrator 20, and preferably may be mounted on the side as shown in FIG. 16. The acceleration sensing module 13 senses an acceleration of the magnetic steel 111. The acceleration of the magnetic steel 11 reflects a movement characteristic of the magnetic steel 11, and a magnitude of a control force generated by the magnetic steel 111 separately may be obtained accordingly.

The force sensing module 14 may comprise one or more force sensors that may be mounted under a base 101 of the seismic vibrator 20 to contact with the to-be-detected surface conveniently. In the embodiment shown in FIG. 16, one or more sandwiched layers 16 may be disposed under the base 101, and the force sensing module 14 is detachably mounted in the sandwiched layer 16. As another example, the force sensing module 14 and the base 101 may be integrated. The above mounting manner and mounting position are merely for an example, and this embodiment of the present disclosure is not limited thereto. The force sensing module 14 and the acceleration sensing module 13 may be mounted at any appropriate position on the seismic vibrator 20 in any appropriate manner. The force sensing module 14 may sense an output force applied by the seismic vibrator 20 onto the to-be-detected surface (for example, a ground, a bridge and a tunnel) to reflect different coupled situations between the seismic vibrator 20 and different types of to-be-detected surfaces.

In work, the upper computer 1011 generates parameter information according to a control parameter input by the user, and provides the parameter information for the lower computer 1012. The parameter information may comprise a driving mode and a driving instruction. The driving mode may comprise a single-frequency driving mode and a frequency-sweeping driving mode. In the single-frequency driving mode, the seismic vibrator 20 is driven with a control signal at a fixed frequency. In the frequency-sweeping driving mode, the seismic vibrator 20 is driven with a control signal at different frequencies from a start frequency to an end frequency within a frequency-sweeping time period. The driving parameter may comprise a frequency, an amplitude, a phase, a frequency-sweeping time and the like of the control signal. The lower computer 1012 generates the control instruction according to the parameter information from the upper computer 1011 to control the DDS chip to generate a corresponding control signal. Specifically, the lower computer 1012 may convert the parameter information of the upper computer into a control instruction for the DDS chip 1021 to achieve the configuration on the DDS chip 1021. The DDS chip 1021 generates the control signal according to the control instruction from the lower computer 1012. For example, if the control instruction indicates the single-frequency driving mode and provides the frequency, amplitude, phase and other information of the control signal, the DDS chip 1021 may generate a single-frequency driving signal for the frequency, amplitude and phase. As of the frequency-sweeping driving mode, the DDS chip 1021 may output a corresponding control signal within the frequency-sweeping time period in terms of the start frequency and the end frequency designated in the parameter information. The isolated amplifier 1022 performs isolated amplification on the control signal generated by the DDS chip 1021, and the power amplifier 1023 performs power amplification on the control signal subjected to the isolated amplification, thus forming a control signal having a magnitude suitable for the seismic vibrator 20. The seismic vibrator 20 may perform mechanical vibration according to the control signal to generate a seismic wave. In the process of the mechanical vibration of the seismic vibrator 20, the acceleration sensing module 13 and the force sensing module 14 mounted on the seismic vibrator 20 provide the acceleration information and the output force information of the seismic vibrator 20 for either or both of the upper computer 1011 and the lower computer 1012, and provide the acceleration information and the output force information subjected to analog-digital conversion of the AD conversion module 15 for the upper computer 1011 or the lower computer 1012 or both. The upper computer 1011 or the lower computer 1012 or both make an adjustment on the control instruction according to either or both of the acceleration information and the output force information. For example, similar to the above content described with reference to FIG. 14, a magnitude of a control force generated by the seismic vibrator 20 separately may be calculated according to the acceleration information, and when the magnitude of the control force exceeds a preset threshold range, the control force is adjusted to the threshold range by adjusting the control signal output by the DDS chip 1021; or a magnitude of an output force of the seismic vibrator 20 actually acted on a to-be-detected surface may be directly obtained or obtained via calculation according to the output force information, and when the magnitude of the control force exceeds a preset threshold range, the control force is adjusted to the threshold range by adjusting the control signal output by the DDS chip 1021; or the control signal output by the output by the DDS chip 1021 may be adjusted according to a combination of the acceleration information and the output force information, thus adjusting a vibration characteristic of the seismic vibrator 20.

Figure 17A:
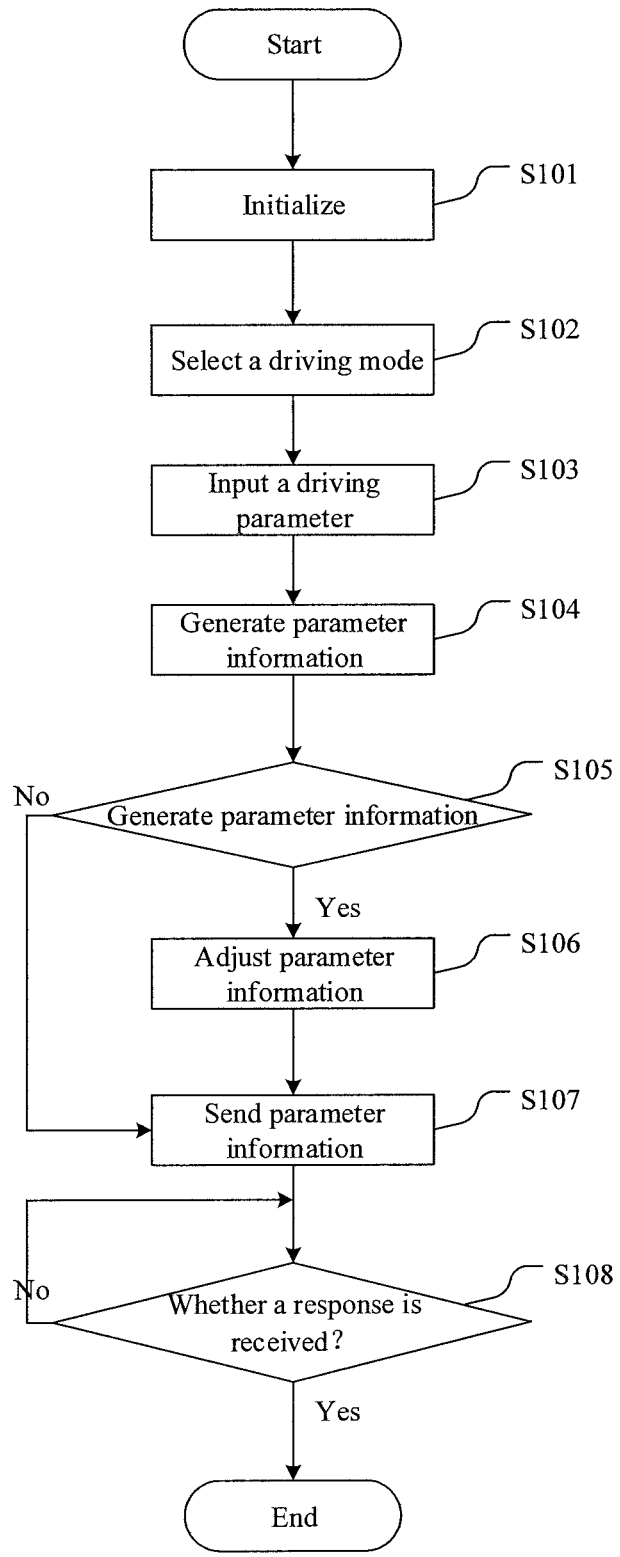
FIG. 17a and FIG. 17b are flowchart of an operation executed by an upper computer and a lower computer of the SEISMIC WAVE GENERATION DEVICE according to an embodiment of the present disclosure.

FIG. 17a is a flowchart of an operation executed by an upper computer 1011 of a seismic wave generation device based on interface compensation according to an embodiment of the present disclosure.

Step S101: perform an initial configuration, such as a VISA configuration of Labview.

Step S102: prompt a user to select a driving mode, and receive the driving mode selected by the user.

Step S103: prompt the user to input a driving parameter for the driving mode, and receive the driving parameter input by the user. For example, if the user selects a single-frequency driving mode in the step S102, it may be appropriate to prompt the user to input a driving parameter such as a frequency, an amplitude and a phase of a control signal; if the user selects a frequency-sweeping driving mode, it may be appropriate to prompt the user to input a driving parameter such as a start frequency, an end frequency, an amplitude, a phase and frequency-sweeping time of a control signal. In this embodiment, the upper computer 1011 may interact with the user via a graphical interface.

Step S104: generate parameter information according to the driving mode and driving parameter input by the user. As shown in FIG. 18a, in the single-frequency driving mode, the parameter information comprises a start identifier, a driving mode bit, a frequency of a control signal, an amplitude of the control signal, a phase of the control signal and an end identifier. As an example, the start identifier may be set as AA55, the driving mode bit 0 indicates the single-frequency driving mode, and the driving mode bit 1 indicates the frequency-sweeping driving mode. A chronological sequence for the frequency of the control signal, the amplitude of the control signal, and the phase of the control signal is not limited thereto in an information field, and may be changed freely as required. As shown in FIG. 18b, in the frequency-sweeping driving mode, the parameter information comprises a start identifier, a start frequency of a control signal, an amplitude of the control signal, a phase of the control signal, an end frequency of the control signal, frequency-sweeping time and an end identifier. similarly, the start identifier may be set as AA55, the driving mode bit 0 indicates the single-frequency driving mode, and the driving mode bit 1 indicates the frequency-sweeping driving mode. A chronological sequence for the start frequency of the control signal, the amplitude of the control signal, the phase of the control signal, the end frequency of the control signal, and frequency-sweeping time is not limited thereto in the information field, and may be changed freely as required.

Step S105: determine whether vibration of a seismic vibrator 20 needs to be adjusted according to acceleration information from an acceleration sensing module 103 and an output force information from a force sensing module 104, if yes, execute the step S106, or otherwise, execute the step S107.

Step S106: adjust the parameter information generated in the step S104. For example, a magnitude of a control force generated by the seismic vibrator 20 separately may be calculated according to the acceleration information, and when the magnitude of the control force exceeds a preset threshold range, the control force is adjusted to the threshold range by adjusting a control parameter; or a magnitude of an output force of the seismic vibrator 20 actually acted on a to-be-detected surface may be directly obtained or obtained via calculation according to the output force information, and when the magnitude of the control force exceeds a preset threshold range, the control force is adjusted to the threshold range by adjusting the control parameter; or the control parameter may be adjusted according to a combination of the acceleration information and the output force information, thus adjusting a vibration characteristic of the seismic vibrator 20. For example, the output force and the control force may be reduced by lowering the frequency of the control signal, and increased by raising the frequency of the control signal, so that the output force and the control force are stabilized within a needed range.

Step S107: send the adjust parameter information to a lower computer 1012.

Step S108: determine whether a response from the lower computer 1012 is received, if yes, end this process, or otherwise, return to the step S108 to continue to wait for the response.

Figure 17B:
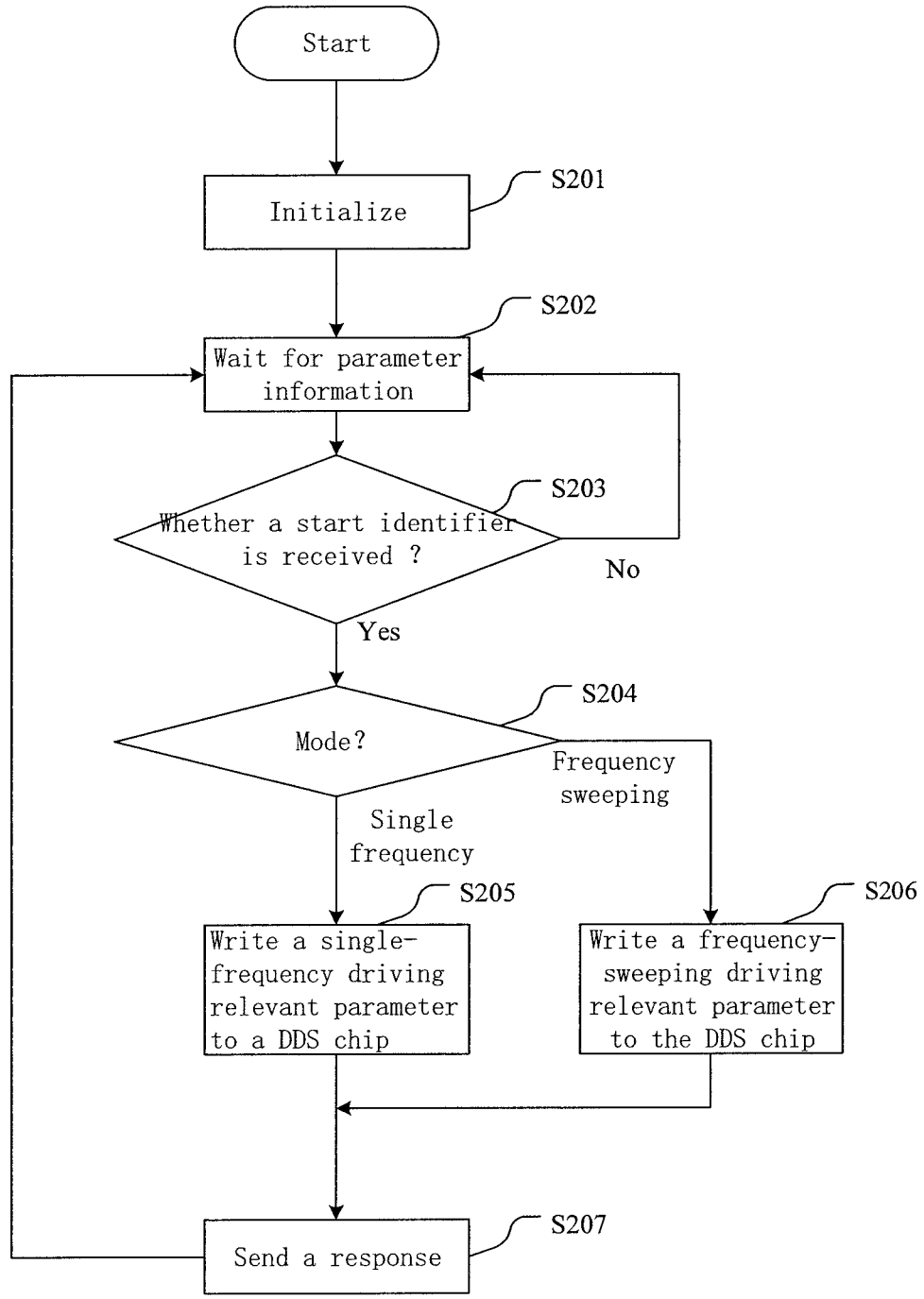

FIG. 17b is a flowchart of an operation executed by a lower computer 1012 of a SEISMIC WAVE GENERATION DEVICE based on interface compensation according to an embodiment of the present disclosure.

Step S201: enable a lower computer 1012 to initialize. The initialization comprises own initialization of the lower computer (for example, a general purpose input output (GPIO), a universal synchronous/asynchronous receiver/transmitter (USART), and an interruption configuration, etc.) and initialization on a DDS chip 1021.

Step S202: wait for receiving parameter information from an upper computer 1011.

Step S203: determine whether a start identifier, such as AA55, in the parameter information is received, if yes, execute the step S204, or otherwise, return to the step S202 to wait continuously.

Step S204: determine whether a driving mode indicated by the parameter information is a single-frequency driving mode or a frequency-sweeping driving mode, if the driving mode is the single-frequency driving mode, execute the step S205, and if the driving mode is the frequency-sweeping driving mode, execute the step S206.

Step S205: write a driving parameter corresponding to the single-frequency driving mode into a DDS chip 1021, for example, a frequency of a control signal, an amplitude of the control signal and a phase of the control signal, etc.

Step S206: write a driving parameter corresponding to the frequency-sweeping driving mode into the DDS chip 1021, for example, a start frequency of a control signal, an amplitude of the control signal, a phase of the control signal, an end frequency of the control signal, and frequency-sweeping time, etc.

Step S207: send a response to the upper computer 1011, and delete the received information, and return to the step S202 to wait for receiving a next piece of parameter information. The response is used for indicating that the lower computer 1021 has successfully received the parameter information from the upper computer and completed relevant configuration.

Although the reception of feedback information of a sensor and adjustment on the parameter information in the above embodiment are executed by the upper computer, this embodiment of the present disclosure is not limited thereto. The reception of the feedback information and the adjustment on the parameter information may also be executed by the lower computer, or executed cooperatively by the upper computer and the lower computer. In some embodiments, the upper computer may also, for example, directly provide the feedback information for the user via a user interface, so that the corresponding calculation and adjustment are made by the user; and the upper computer provides the parameter information being adjusted of the user for a signal generation module via the lower computer.

In this embodiment of the present disclosure, an acceleration sensing module and a force sensing module mounted on a seismic vibrator form a double closed-loop control loop. The acceleration information obtained by the acceleration sensing module can reflect a control force generated by the seismic vibrator separately, and the output force information obtained by the force sensing module can reflect an output force applied by the seismic vibrator onto a to-be-detected surface in fact, that is, a coupled situation between the seismic vibrator and different to-be-detected surfaces. By driving the seismic vibrator with the consideration to the control force and a driving force, the interface compensation between the seismic vibrator and the to-be-detected surface may be achieved, and the driving accuracy may be improved.

In this embodiment of the present disclosure, by controlling with the combination of an upper computer and a lower computer, a user may directly interact with the upper computer via a user interface to improve the user experience, and the upper computer may further adjust a driving parameter according to a feedback of an acceleration sensor and a force sensor, or even the user may directly observe the feedback from an acceleration sensor and a force sensor on the upper computer, and manually adjust various driving parameters and driving modes, so that the efficient and flexible driving control on the seismic vibrator is achieved.

It is to be explained that the relationship terms, such as "first" and "second", are used herein only for distinguishing one entity or operation from another entity or operation but do not necessarily require or imply that there exists any actual relationship or sequence of this sort between these entities or operations. Furthermore, terms "comprising", "comprising" or any other variants are intended to cover the non-exclusive comprising, thereby making that the process, method, merchandise or device comprising a series of elements comprise not only those elements but also other elements that are not listed explicitly or the inherent elements to the process, method, merchandise or device. In the case of no more limitations, the element limited by the sentence "comprising a . . . " does not exclude that there exists another same element in the process, method, merchandise or device comprising the element.

According to the embodiments of the present disclosure, for example, the embodiments described above, these embodiments neither describe all details nor limit the present disclosure only as the specific embodiments. Obviously, many modifications and variations are possible in light of the above. These embodiments are selected and specifically described in the specification with the purpose of better explaining a principle and an actual application of the present disclosure better, so that the person skilled in the art may perfectly utilize the present disclosure and make a modification based upon the present disclosure for use. The present disclosure is only limited by the claims and all ranges and equivalents thereof.

The invention claimed is:

1. A seismic vibrator, comprising:
a base;
a mounting plate;

a first spring configured to connect said base and said mounting plate, wherein said mounting plate is configured to reciprocate, based on said first spring, relative to said base;

a coil which is rigidly fixed with said base;

a magnet having one end fixed with said mounting plate, and the other end stretched into said coil;

a magnetic steel fixed with and in contact with said magnet, wherein a gap for accommodating said coil is provided between said magnetic steel and said magnet; and a counterweight fixed with said mounting plate, wherein the seismic vibrator further comprises a coil bracket, configured to fix said coil with said base, wherein said coil bracket is of a hollow cylindrical shape, said coil bracket is fixed with said base, said coil is arranged on an outer circumferential surface of said coil bracket, and the other end of the magnet is stretched into the hollow cylindrical shape of said coil bracket.

2. The seismic vibrator according to claim 1 wherein a through hole is arranged on said mounting plate; and said seismic vibrator further comprises:

at least one set of guide structures, wherein each set of said guide structures comprises a supporting rod and a linear bearing; said linear bearing passes through said through hole on said mounting plate to fix on said mounting plate; and one end of said supporting rod passes through said linear bearing, and the other end of said supporting rod is fixed with said base, so that said mounting plate slides along said supporting rod, the number of said first springs is the same as the number of sets of said guide structures, said first spring disposed coaxially with said supporting rod, wherein said supporting rod is located in said first spring.

3. The seismic vibrator according to claim 1, wherein said mounting plate comprises a first surface facing to said base and a second surface backing to said base; and said magnet and said magnetic steel are arranged at said first surface, and said counterweight is arranged at said second surface.

4. The seismic vibrator according to claim 1, further comprising
a spring bracket configured to fix said first spring and said base.

5. The seismic vibrator according to claim 1, further comprising:
a shell covered on said base, and forms a space with said base for accommodating an internal structure of said seismic vibrator.

6. The seismic vibrator according to claim 5, wherein said shell comprises a top surface opposite to said base and a lateral surface located between said top surface and said base, and said seismic vibrator further comprises:
a second spring configured to connect said mounting plate to said top surface of said shell.

7. A vibration device, comprising:
a plurality of seismic vibrators according to claim 1; and adjustable bases disposed below each seismic vibrator, and is configured to adjust position, inclination angle and direction of each said seismic vibrator.

8. The vibration device according to claim 7, wherein said adjustable bases are arranged so that plurality of said seismic vibrators are equidistantly distributed on a same circumference in a same horizontal plane; and inclination angles of central axes of plurality of said seismic vibrators relative to a vertical direction are said same.

9. The vibration device according to claim 8, wherein the number of said seismic vibrators is three.

10. A seismic vibrator, comprising:
a base;
a coil which is rigidly fixed on said base;
a magnet;
a magnetic steel fixed with and in contact with said magnet; and
a spring configured to connect said magnet and/or said magnetic steel to said base, wherein said magnet and said magnetic steel are configured to reciprocate, based on said spring, relative to said coil, wherein a coil bracket, configured to fix said coil with said base, wherein said coil bracket is of a hollow cylindrical shape, said coil bracket is fixed with said base, said coil is arranged on an outer circumferential surface of said coil bracket, and an end of the magnet is stretched into the hollow cylindrical shape of said coil bracket.

11. The seismic vibrator according to claim 10, wherein a plurality of through holes communicating an interior and an exterior of said coil bracket are arranged at said base and/or said coil bracket; and plurality of said through holes are uniformly arranged at said base and/or said coil bracket.

12. The seismic vibrator according to claim 10, further comprising:
a set of guide structures coaxially arranged with said coil bracket, and each set of said guide structures comprises a supporting rod and a linear bearing, wherein said linear bearing is fixed on said base; and one end of said supporting rod is fixed with said magnet and/or said magnetic steel, and the other end of said supporting rod passes through said linear bearing, so that said magnet and said magnetic steel slide along said supporting rod.

13. The seismic vibrator according to claim 10, wherein said magnetic steel is of a hollow cylindrical shape having an opened one end and a sealed end; said magnet is of a cylindrical shape and passes through said opened end of said magnetic steel to fix with said sealed end of said magnetic steel; an outer diameter of said magnet is smaller than an inner diameter of said magnetic steel, so that a gap is arranged between an outer circumferential surface of said magnet and an inner circumferential surface of said magnetic steel, and said gap is corresponding to said coil so that said coil is accommodated.

14. The seismic vibrator according to claim 12, wherein the number of said spring is one, said spring coaxially arranged with said supporting rod, and said supporting rod is located in said spring.

15. The seismic vibrator according to claim 13, wherein a plurality of said springs are provided and uniformly arranged at said opened end of said magnetic steel; and certain ends of said springs are connected to said magnetic steel, and the other ends of said springs are connected to said base.

* * * * *